(12) United States Patent
Wu et al.

(10) Patent No.: US 12,413,995 B2
(45) Date of Patent: Sep. 9, 2025

(54) METHOD AND APPARATUS FOR POSITIONING IN COMMUNICATION SYSTEM

(71) Applicant: Samsung Electronics Co., Ltd., Suwon-si (KR)

(72) Inventors: Min Wu, Beijing (CN); Qi Xiong, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 17/646,969

(22) Filed: Jan. 4, 2022

(65) Prior Publication Data

US 2022/0225145 A1 Jul. 14, 2022

(30) Foreign Application Priority Data

Jan. 13, 2021 (CN) .......................... 202110044487.3

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0051* (2013.01); *H04W 64/00* (2013.01);
(Continued)

(58) Field of Classification Search
None
See application file for complete search history.

(56) References Cited

U.S. PATENT DOCUMENTS

2020/0367193 A1 11/2020 Cha et al.
2021/0194734 A1\* 6/2021 Herath .............. H04W 56/0005

FOREIGN PATENT DOCUMENTS

EP 2882219 A2 \* 6/2015 ............. H04L 43/06
EP 3989670 A1 \* 4/2022 ............. H04W 72/23
(Continued)

OTHER PUBLICATIONS

International Search Report and Written Opinion of the International Searching Authority in connection with International Application No. PCT/KR2022/000031 issued Mar. 22, 2022, 7 pages.
(Continued)

*Primary Examiner* — Peter Chen

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method performed by a user equipment (UE), comprising: obtaining configuration information of a reference signal for positioning measurement, wherein the reference signal includes at least one of a first signal for downlink positioning measurement or a second signal for uplink positioning measurement; and performing an operation related to the positioning measurement in a radio resource control (RRC) idle state or a RRC inactive state.

18 Claims, 26 Drawing Sheets

(51) Int. Cl.
    *H04W 64/00*     (2009.01)
    *H04W 68/00*     (2009.01)
    *H04W 74/04*     (2009.01)
    *H04W 74/0833*   (2024.01)
    *H04W 76/20*     (2018.01)
    *H04W 76/30*     (2018.01)

(52) U.S. Cl.
    CPC ......... *H04W 68/005* (2013.01); *H04W 74/04* (2013.01); *H04W 74/0841* (2013.01); *H04W 76/20* (2018.02); *H04W 76/30* (2018.02)

(56) References Cited

FOREIGN PATENT DOCUMENTS

| EP | 4161174 A1 | * | 4/2023 | ........... G01S 5/0236 |
| WO | WO-2020146739 A1 | * | 7/2020 | ........... H04L 5/0051 |
| WO | WO-2020198269 A1 | * | 10/2020 | ........... G01S 5/0236 |

OTHER PUBLICATIONS

Moderator (CATT), "FL Summary #10 for Potential Positioning Enhancements", R1-2009679, 3GPP TSG-RAN WG1 #103-e, e-meeting, Oct. 26-Nov. 13, 2020, 147 pages.

Interdigital Inc., "Discussion on potential positioning enhancements", R1-2008491, 3GPP TSG-RAN WG1 #103-e, e-meeting, Oct. 26-Nov. 13, 2020, 8 pages.

Sony, "Considerations on potential positioning enhancements", R1-2008365, 3GPP TSG-RAN WG1 #103-e, e-meeting, Oct. 26-Nov. 13, 2020, 7 pages.

Vivo, "Discussion on potential positioning enhancements", R1-2007666, 3GPP TSG-RAN WG1 #103-e, e-meeting, Oct. 26-Nov. 13, 2020, 49 pages.

* cited by examiner

FIG. 8

ACQUIRE TRIGGER INFORMATION, WHICH IS USED TO ACTIVATE THE UE TO
PERFORM OPERATIONS RELATED TO POSITIONING MEASUREMENT IN ~S430
THE RRC UNCONNECTED STATE

FIG. 9

TRANSMIT AN ACKNOWLEDGEMENT TO TRIGGER INFORMATION —S440

FIG. 12

RECEIVE FIRST INDICATION INFORMATION, WHICH IS USED FOR INDICATING WHETHER A SYNCHRONIZATION SIGNAL BLOCK (SSB) CAN BE USED FOR ASSISTING IN DOWNLINK POSITIONING MEASUREMENT ~S1010

FIG. 13

RECEIVE SECOND INDICATION INFORMATION WHICH INDICATES A POWER OFFSET OF ENERGY PER RESOURCE ELEMENT BETWEEN THE FIRST SIGNAL AND THE SSB ~S1020

METHOD AND APPARATUS FOR POSITIONING IN COMMUNICATION SYSTEM

CROSS-REFERENCE TO RELATED APPLICATION

This application is based on and claims priority under 35 U.S.C. § 119 to Chinese Patent Application No. 202110044487.3, filed on Jan. 13, 2021, in the Chinese Intellectual Property Office, the disclosure of which is incorporated by reference herein in its entirety.

BACKGROUND

1. Field

The disclosure relates to the technical field of wireless communication, and in particular to a method and an apparatus for positioning in a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Additional aspects will be set forth in part in the description which follows and, in part, will be apparent from the description, or may be learned by practice of the presented embodiments.

According to an aspect of the disclosure, there is provided a method performed by a user equipment (UE), comprising: obtaining configuration information of a reference signal for positioning measurement, wherein the reference signal includes a first signal for downlink positioning measurement or a second signal for uplink positioning measurement; and performing an operation related to the positioning measurement in a radio resource control (RRC) idle state or a RRC inactive state.

According to another aspect of the disclosure, there is provided a UE, comprising: a transceiver configured to transmit and receive signals with the outside; and a processor configured to control the transceiver to perform the method performed by the UE.

According to another aspect of the present disclosure, there is provided a non-transitory computer-readable recording medium having stored thereon a program, which when performed by a computer, performs any one of the methods described above.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to explain the technical schemes of the embodiments of the disclosure more clearly, drawings of the embodiments will be briefly introduced below, Apparently, drawings in the following description only refer to some embodiments of the disclosure, but do not limit the disclosure.

The above and other aspects, features and advantages of certain embodiments of the disclosure will be more apparent from the following detailed description, taken in conjunction with the accompanying drawings, in which:

FIG. 8 illustrates a part of flowchart of a method performed by a UE according to an embodiment of the disclosure;

FIG. 9 illustrates a part of flowchart of a method performed by a UE according to an embodiment of the disclosure;

FIG. 12 illustrates a part of flowchart of a method performed by a UE according to an embodiment of the disclosure;

FIG. 13 illustrates a part of flowchart of a method performed by a UE according to an embodiment of the disclosure;

The same reference numerals are used to represent the same elements throughout the drawings.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
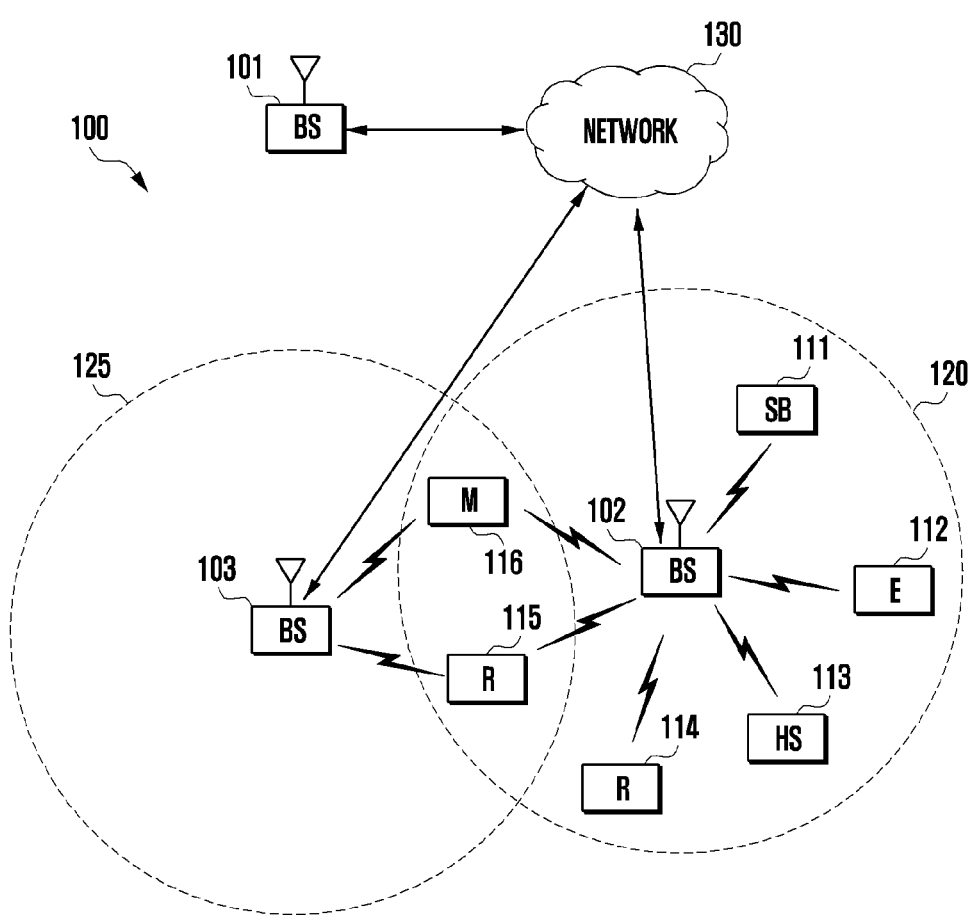
FIG. 1 illustrates an exemplary wireless network according to various embodiments of the disclosure.

FIG. 1 illustrates an example wireless network 100 according to various embodiments of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of user equipments (UEs) within a coverage area 120 of gNB 102. The first plurality of UEs include a UE 111, which may be located in a small business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
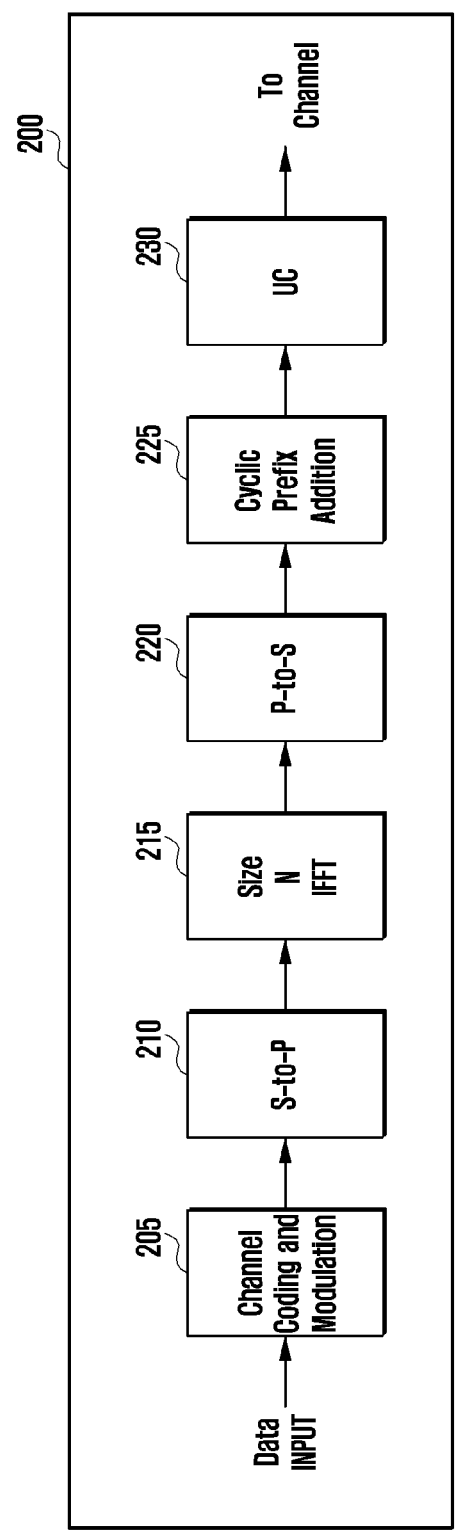
FIG. 2A illustrates an example wireless transmission path according to the disclosure.
Figure 2B:
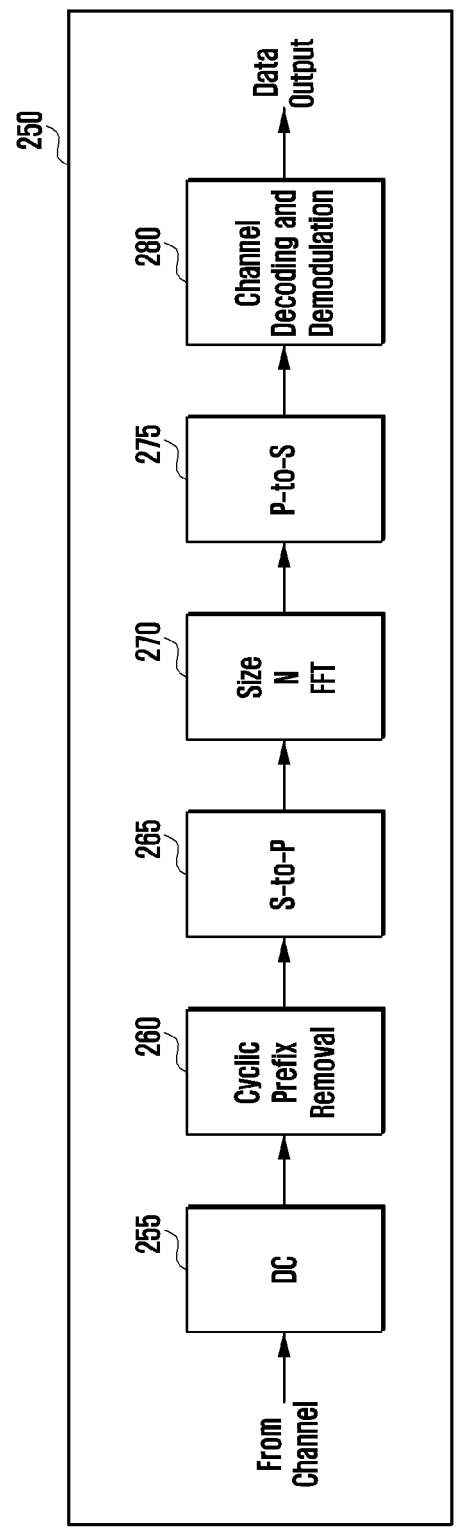
FIG. 2B illustrates an example wireless transmission path according to the disclosure.

FIGS. 2A and 2B illustrate example wireless transmission and reception paths according to the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in a gNB 102 and a UE 116. The size N IFFT block 215 performs IFFT operations on the N parallel symbol streams to generate a time-domain output signal. The parallel-to-serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from a gNB 102 arrives at a UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
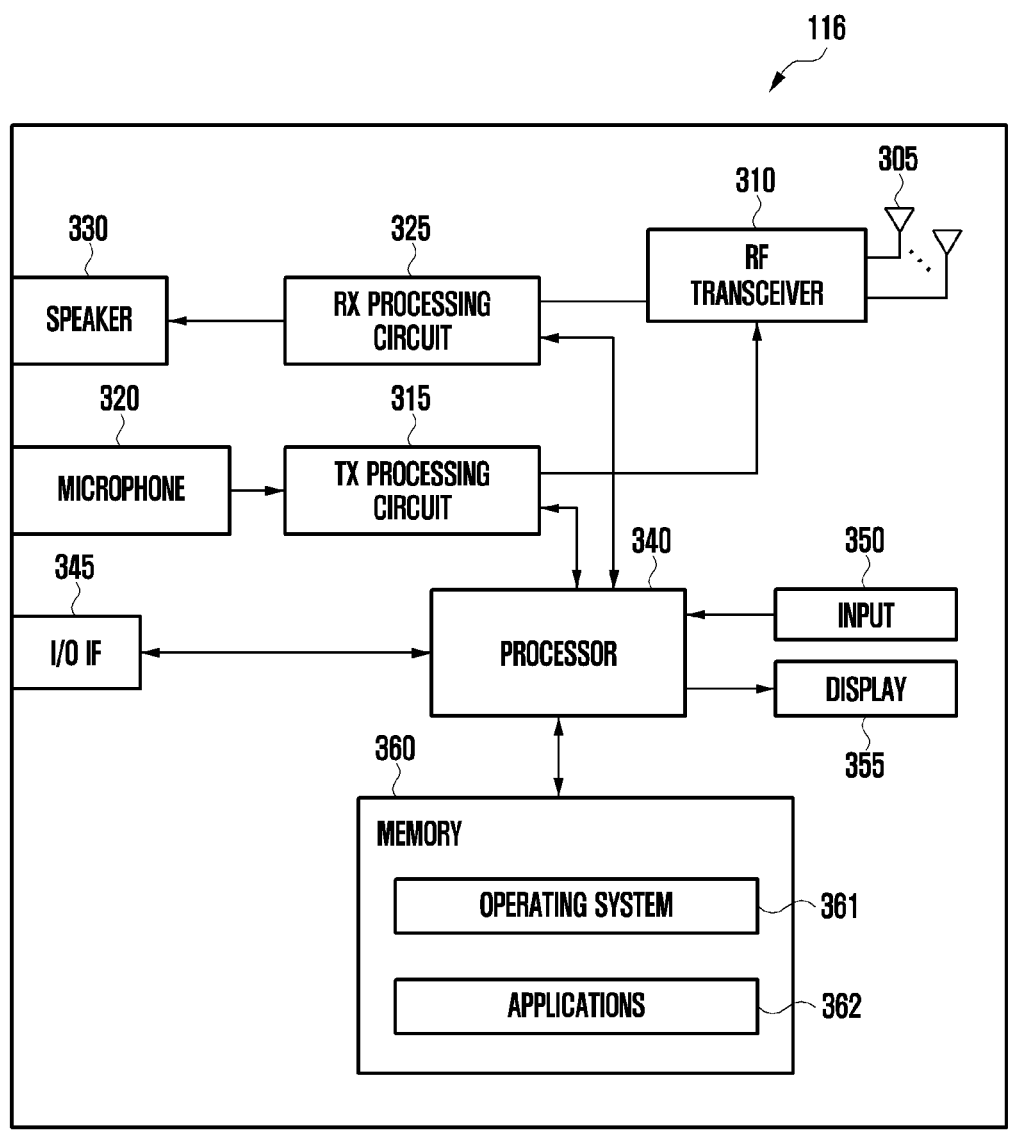
FIG. 3A illustrates an exemplary UE according to the disclosure.

FIG. 3A illustrates an example UE 116 according to the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
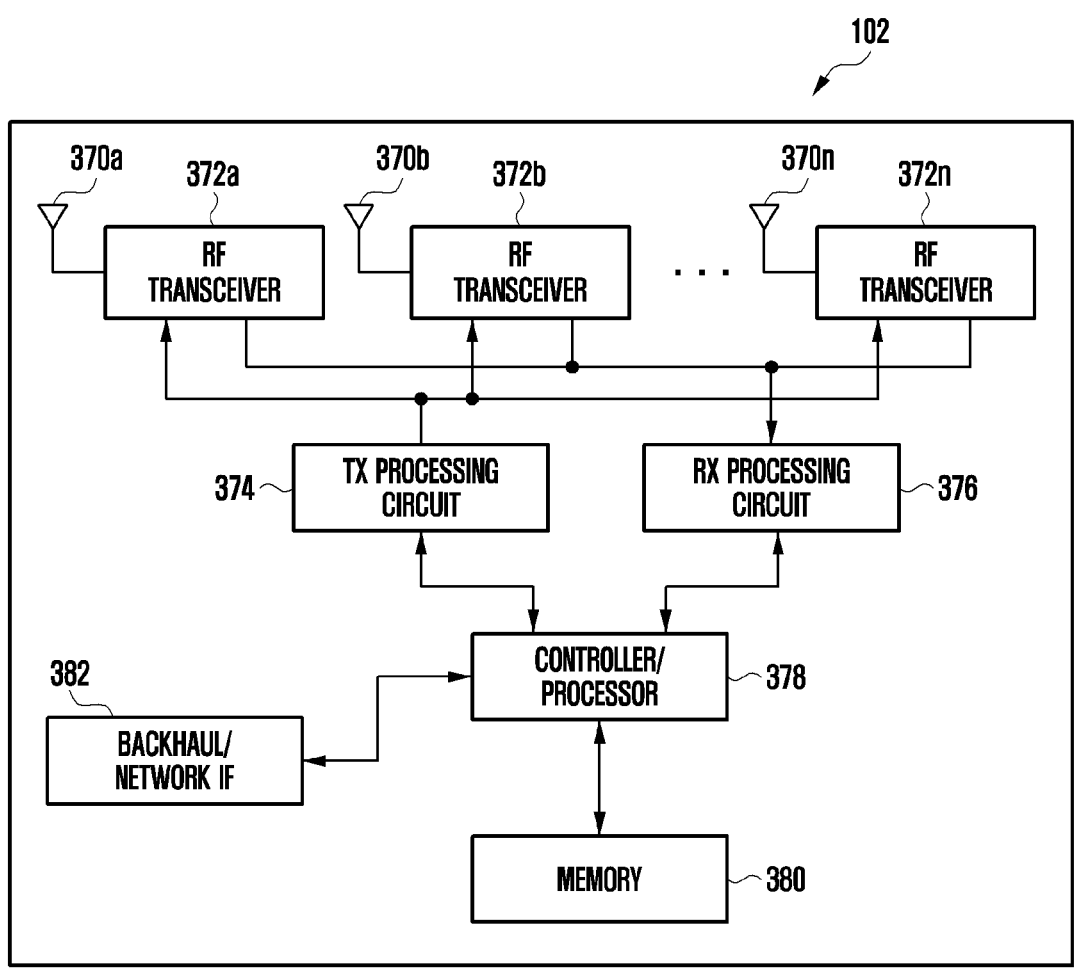
FIG. 3B illustrates an example base station gNB according to the disclosure.

FIG. 3B illustrates an example gNB 102 according to the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The exemplary embodiments of the disclosure are further described below in conjunction with the accompanying drawings.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

In the existing LTE system and NR system, 3GPP standard specifies a variety of positioning technologies, each of which is based on specific measurement information. For example, the positioning technologies for calculating location information based on time measurement include: a downlink time difference of arrival (DL-TDOA) positioning technology, an uplink time difference of arrival (UL-TDOA) positioning technology and a multi-cell round trip time (Multi-RTT) positioning technology; and the positioning technologies for calculating location information based on angle measurement include: a downlink angle of arrivals (DL-AoD) positioning technology and uplink angle of arrivals (UL-AoD) positioning technology.

The positioning technology is realized by performing positioning measurement on reference signals, and a location management function (LMF) entity on the network side is responsible for calculating location information based on the results of positioning measurement. If a positioning request is initiated by the user equipment (UE), the LMF informs the calculated location information to the UE; if the positioning request is initiated by the network side, the LMF does not need to inform the UE of the calculated location information. The positioning measurement can be positioning measurement on a downlink reference signal or an uplink reference signal. For example, the downlink reference signal used for positioning measurement is a positioning reference signal (PRS), and the uplink reference signal used for positioning measurement is a sounding reference signal (SRS).

For downlink positioning measurement, the PRS received by the UE can come from multiple base stations, including serving base stations and non-serving base stations. The UE reports downlink positioning measurement results based on the PRS to the LMF, and the LMF calculates position information according to the downlink positioning measurement results. For uplink positioning measurement, the UE transmits an SRS, which can be received by multiple base stations, including serving base stations and non-serving base stations. The base stations transmit uplink positioning measurement results based on the SRS to the LMF, which calculates location information according to the uplink positioning measurement results. The LMF can calculate location information independently based on either the downlink positioning measurement results or the uplink positioning measurement results. LMF can also calculate location information by combining the downlink positioning measurement results with the uplink positioning measurement results. There is no binding relationship between the downlink positioning measurements and the uplink positioning measurements.

In the 5G NR Rel-17 standard of 3GPP, the research on enhanced positioning technology is carried out, including enhancing the accuracy, time delay of positioning technology and efficiency of network and equipment. One of the enhancement directions is to support positioning technology in a RRC unconnected state, that is, a UE is able to perform downlink positioning measurement and/or transmit uplink positioning reference signals in the RRC unconnected state, which includes an RRC idle mode and an RRC inactive mode. In the existing NR system, the positioning technology is realized in an RRC connected state, and a positioning measurement method performed by the user equipment (UE) in the RRC unconnected state has not been disclosed. Actually, there is no necessary correlation between positioning requirements and service transmission, that is, there may be no data transmission during positioning measurement, but in order to support positioning measurement, the UE may enter an RRC connected state, and establishing the RRC connected state may introduce a lot of signaling overhead. If the UE can support positioning measurement in the RRC unconnected state, it may greatly improve the efficiency of network and equipment. In addition, the technical details of supporting downlink positioning measurement and/or transmitting an uplink positioning reference signal in the RRC unconnected state are still unclear.

The embodiment of the disclosure provides a method performed by a user equipment (UE), which comprises: acquiring configuration information of a reference signal for positioning measurement, wherein the reference signal for positioning measurement includes a first signal for downlink positioning measurement and/or a second signal for uplink positioning measurement; and performing operations related to positioning measurement in a radio resource control (RRC) unconnected state. With the above method, the UE can realize positioning measurement in the RRC unconnected state, which saves a lot of signaling overhead, reduces network delay, and greatly improves the efficiency of network and equipment. In addition, the disclosure also provides relevant technical details of the positioning measurement method performed by the user equipment (UE) in the radio resource control (RRC) unconnected state.

Next, the implementation of the method performed by the user equipment in the radio resource control (RRC) unconnected state provided by the embodiment of the disclosure will be described with reference to the accompanying drawings. Here, the RRC unconnected state includes an RRC idle state and/or an RRC inactive state.

Figure 4:
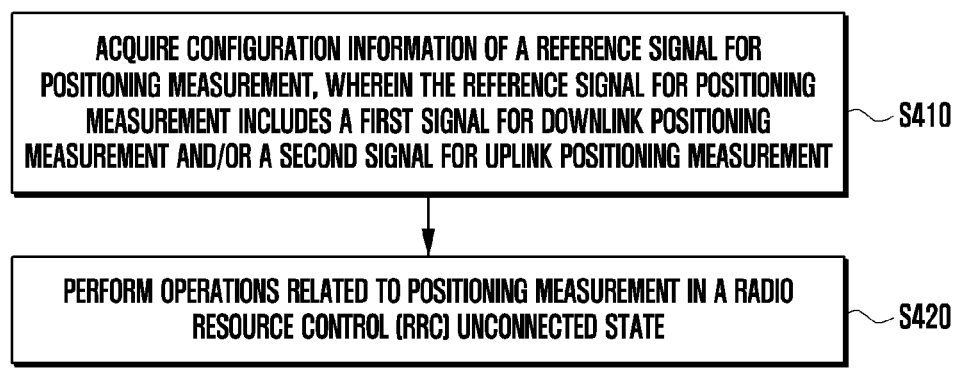
FIG. 4 illustrates a flowchart of a method performed by a UE according to an embodiment of the disclosure.

FIG. 4 illustrates a flowchart of a method performed by a user equipment according to an embodiment of the disclosure.

Referring to FIG. 4, the method includes steps S410 and S420.

Step S410, configuration information of a reference signal for positioning measurement is acquired, herein, the reference signal for positioning measurement includes a first signal for downlink positioning measurement and/or a second signal for uplink positioning measurement.

As an implementation, the first signal may include a positioning reference signal (PRS), and the second signal may include a sounding reference signal (SRS) or a physical random access channel (PRACH).

It can be understood that the first signal and the second signal are not limited to this, and any signal that can realize the method of the embodiment of this disclosure belongs to the scope of protection of this disclosure.

Step S420, operations related to positioning measurement are performed in a radio resource control (RRC) unconnected state.

With the above method, the UE can realize positioning measurement in RRC unconnected state, which saves a lot of signaling overhead, reduces network delay, and greatly improves the efficiency of network and equipment.

The specific implementation of step S420 will be described in detail with reference to FIGS. 5 to 6.

Figure 5:
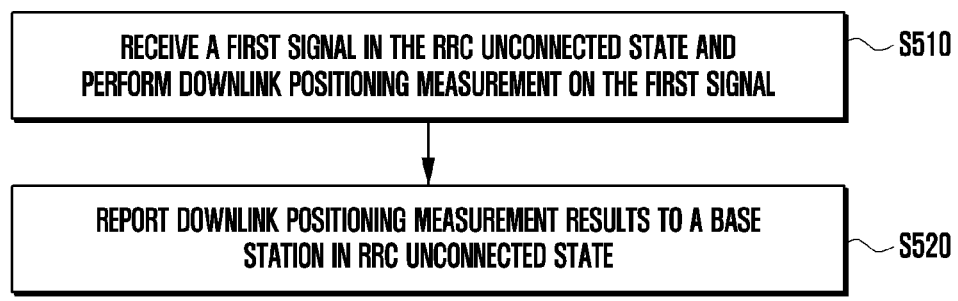
FIG. 5 illustrates a part of flowchart of step S420 in a method performed by a UE according to an embodiment of the disclosure.

FIG. 5 illustrates a part of the flowchart of step S420 in a method according to an embodiment of the disclosure.

Referring to FIG. 5, if the reference signal for positioning measurement is the first signal, step S420 may include step S510 and step S520.

Step S510, the first signal in RRC is received in the unconnected state and downlink positioning measurement is performed on the first signal.

Step S520, downlink positioning measurement results are reported to a base station in the RRC unconnected state.

With the above method, the UE can realize downlink positioning measurement in the RRC unconnected state, which saves a lot of signaling overhead, reduces network delay, and greatly improves the efficiency of network and equipment. And the downlink positioning measurement takes place in the user equipment, which greatly saves the overhead of the base station for positioning measurement, so that the base station can directly obtain the location information of the UE by using the downlink positioning measurement results reported by the UE, thereby realizing the positioning of the UE.

Figure 6:
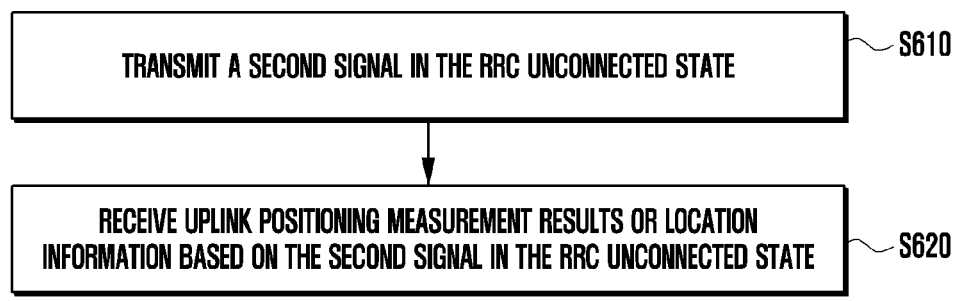
FIG. 6 illustrates another part of flowchart of step S420 in a method performed by a UE according to an embodiment of the disclosure.

FIG. 6 illustrates another part of the flowchart of step S420 in a method according to an embodiment of the disclosure.

Referring to FIG. 6, if the reference signal for positioning measurement is the second signal, step S420 may include step S610.

Step S610, a second signal is transmitted in the RRC unconnected state.

Furthermore, this step S420 may also include a step S620.

Step S620: the uplink positioning measurement results or location information based on the second signal are received in the RRC unconnected state.

Herein, the positioning measurement results refer to values for performing positioning measurement with respect to a reference signal for positioning measurement, for example, a power value of the reference signal for positioning measurement, and the like.

The location information refers to location information which is further calculated by the positioning measurement result, for example, the location coordinates of the UE.

It can be understood that step S420 may include only step S610 but not step S620, or both steps S610 and S620, which is not limited by the disclosure.

With the above method, the UE can realize uplink positioning measurement in the RRC unconnected state, which saves a lot of signaling overhead, reduces network delay, and greatly improves the efficiency of network and equipment. And the uplink positioning measurement takes place in the base station, which greatly saves the overhead of the user equipment for positioning measurement, so that the user equipment can directly utilize the uplink positioning measurement results or location information transmitted by the base station, thereby realizing the positioning of the UE.

Figure 7:
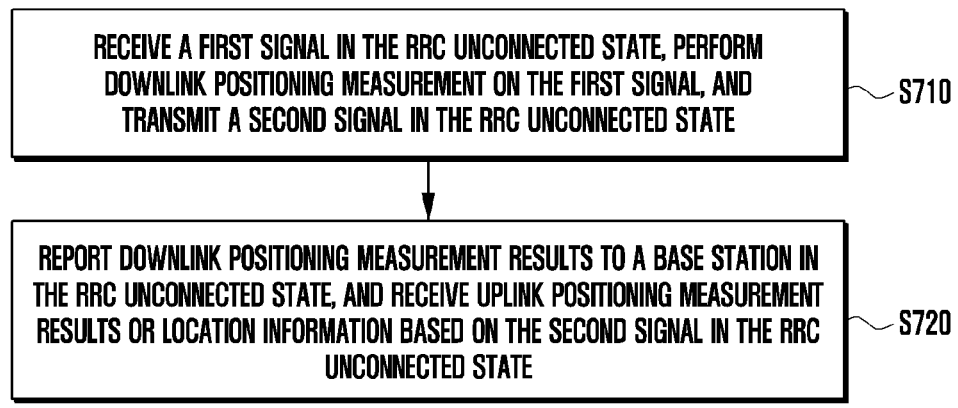
FIG. 7 illustrates yet another part of flowchart of step S420 in a method performed by a UE according to an embodiment of the disclosure.

FIG. 7 illustrates a yet another part of the flowchart of step S420 in a method according to an embodiment of the disclosure.

Referring to FIG. 7, if the reference signal for positioning measurement includes a first signal and a second signal, step S420 may include step S710 and step S720.

Step S710, the first signal is received in the RRC unconnected state, downlink positioning measurement is performed on the first signal, and the second signal is transmitted in the RRC unconnected state.

Step S720, the downlink positioning measurement results are reported to the base station in the RRC unconnected state, and the uplink positioning measurement results or location information based on the second signal are received in the RRC unconnected state.

It can be understood that "receiving the uplink positioning measurement results or location information based on the second signal in the RRC unconnected state" in step S720 is not a necessary step and can be omitted.

With the above method, the UE can realize uplink positioning measurement and downlink positioning measurement in the RRC unconnected state, which saves a lot of signaling overhead, reduces network delay and greatly improves the efficiency of network and equipment. Moreover, because the uplink positioning measurement and the downlink positioning measurement can be realized at the same time, the result of positioning is more accurate.

In addition, the method performed by the user equipment in the radio resource control (RRC) unconnected state provided by the embodiment of the disclosure may include other steps besides step S410 and step S420, for example, include step S430 before step S420, or further include step S440.

FIG. 8 illustrates a part of a flowchart of a method performed by a user equipment according to an embodiment of the disclosure.

Referring to the FIG. 8, the method may include step S430.

Step S430, trigger information is acquired, herein, the trigger information is used to activate the UE to perform operations related to positioning measurement in the RRC unconnected state.

In this way, the UE performs the operation related to positioning measurement only after acquiring the trigger information, and does not need to wake up periodically to perform the operation related to positioning measurement, which makes it more flexible for the UE to perform the operation related to positioning measurement in RRC unconnected state.

FIG. 9 illustrates a part of a flowchart of a method performed by a user equipment according to an embodiment of the disclosure.

Referring to the FIG. 9, the method may include step S440.

Step S440, an acknowledgement to the trigger information is transmitted.

Herein, the acknowledgement is carried by a medium access control control element (MAC CE); or, carried by physical layer uplink control information (UCI).

In this way, unnecessary resource wastes caused by the failure of UE to receive the trigger information can be avoided, and transmission reliability can be ensured.

In addition, due to the mobility of the UE, a cell where the UE in the RRC unconnected state camps may change, that is, a cell where the UE newly camps is different from a cell where the UE previously located while acquiring the configuration information of the reference signal for positioning measurement, so the UE needs to judge whether the acquired configuration information of the reference signal for positioning measurement is still available in the newly camping cell.

Figure 10:
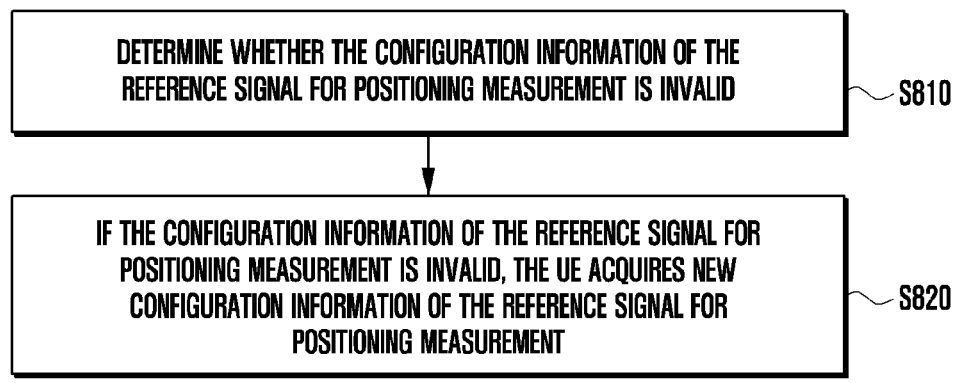
FIG. 10 illustrates a part of flowchart of a method performed by a UE according to an embodiment of the disclosure.

FIG. 10 illustrates a part of a flowchart of a method performed by a user equipment in the RRC unconnected state according to an embodiment of the disclosure.

Referring to FIG. 10, the method may further include step S810 and S820.

Step S810, whether the configuration information of the reference signal for positioning measurement is invalid is determined.

Step S820, if the configuration information of the reference signal for positioning measurement is invalid, the UE acquires new configuration information of the reference signal for positioning measurement.

Figure 11:
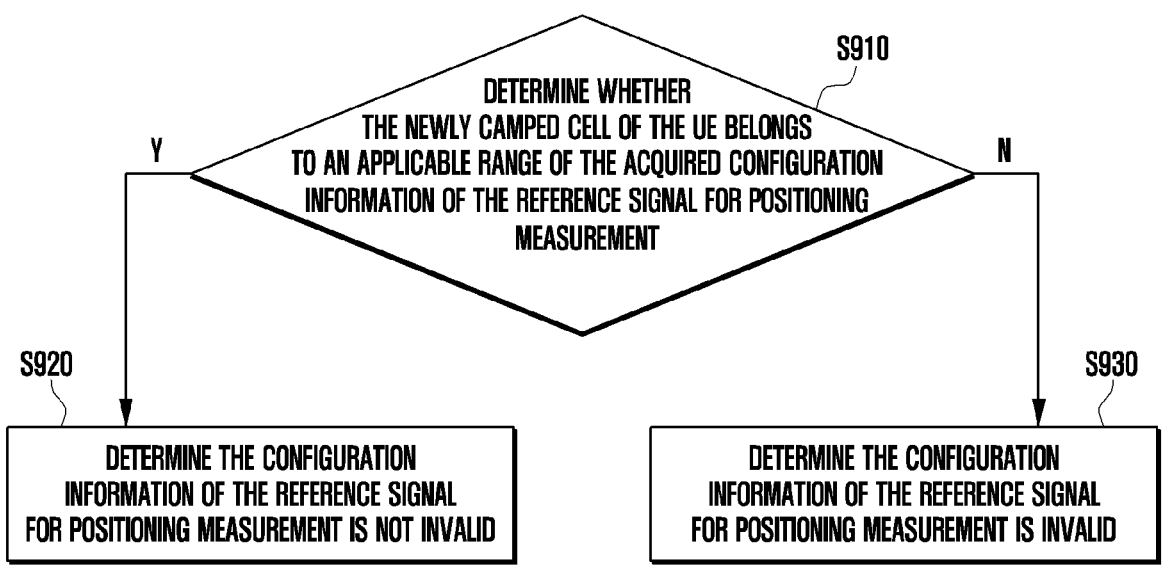
FIG. 11 illustrates a part of flowchart of step S810 in a method performed by a UE according to an embodiment of the disclosure.

FIG. 11 illustrates a part of the flowchart of step S810 in a method according to an embodiment of the disclosure.

Referring to FIG. 11, Step S810 may include steps S910 to S930.

At step S910, whether the newly camped cell of the UE belongs to an applicable range of the acquired configuration information of the reference signal for positioning measurement is determined.

Herein, the applicable range includes at least one of the following: a same tracking area TA, a management area of a same positioning management function LMF entity, all cells associated with the configuration information of the reference signal for positioning measurement, or a same cell.

If yes, step S920 is performed, otherwise, step S930 is performed.

Step S920, that the configuration information of the reference signal for positioning measurement is valid is determined.

Step S930, that the configuration information of the reference signal for positioning measurement is invalid is determined In this way, the UE can acquire new and effective configuration information of the reference signal used for positioning measurement when moving, so that the result of positioning is more accurate.

In order to improve the accuracy of the downlink positioning measurement and save positioning delay, SSB can be used to assist in the downlink positioning measurement, that is, a UE can combine the PRS and SSB to obtain the downlink positioning measurement results.

FIG. 12 illustrates a part of a flowchart of a method performed by a user equipment in the RRC unconnected state according to an embodiment of the disclosure.

Referring to FIG. 12, the method may further include S1010.

Step S1010, first indication information is received. Herein, the first indication information is used for indicating whether a synchronization signal block (SSB) can be used for assisting in downlink positioning measurement.

FIG. 13 illustrates a part of a flowchart of a method performed by a user equipment in the RRC unconnected state according to an embodiment of the disclosure.

Referring to FIG. 13, the method may further include S1020.

Step S1020, second indication information is received. Herein, the second indication information indicates a power offset of energy per resource element between the first signal and the SSB.

By adopting SSB to assist in the downlink positioning measurement, the accuracy of the downlink positioning measurement is greatly improved and the positioning delay is saved.

Figure 14:
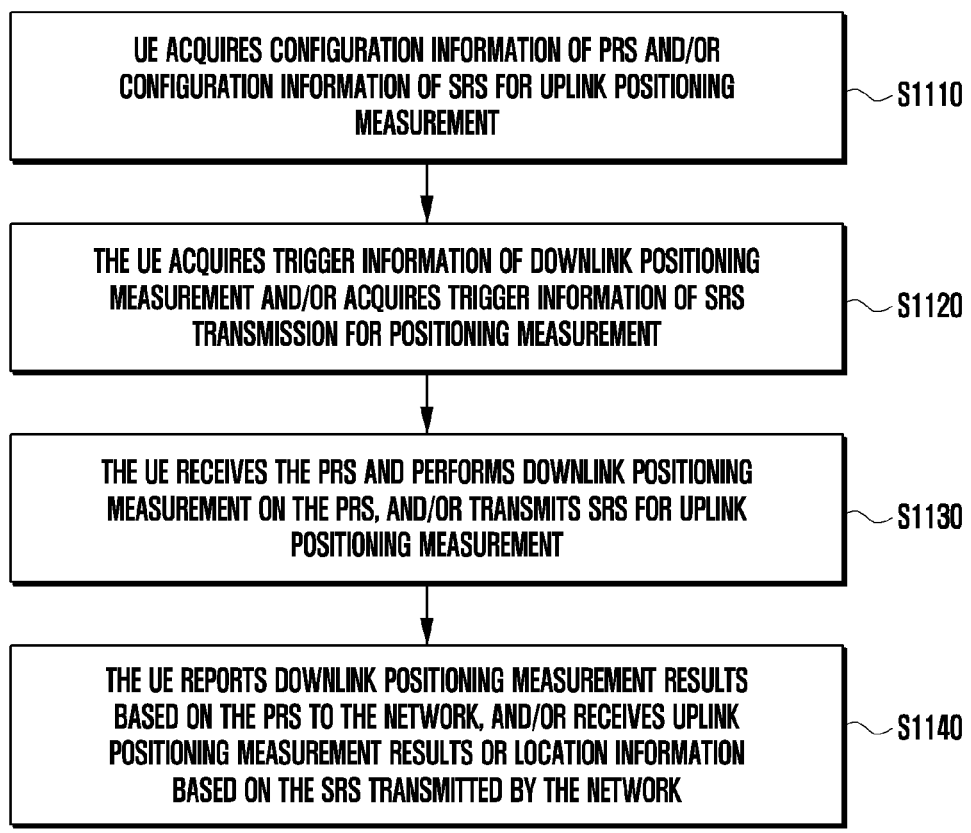
FIG. 14 illustrates a flowchart of another method performed by a UE according to an embodiment of the disclosure.

FIG. 14 illustrates a flowchart of another method performed by a user equipment in the RRC unconnected state according to an embodiment of the disclosure.

Referring to FIG. 14, the method may include steps S1110 to 1140.

Step S1110, the UE acquires configuration information of PRS and/or configuration information of SRS for uplink positioning measurement.

Step S1120, the UE acquires trigger information of downlink positioning measurement and/or acquires trigger information of SRS transmission for positioning measurement.

Step S1130, the UE receives the PRS, performs downlink positioning measurement on the PRS, and/or transmits SRS for uplink positioning measurement.

Step S1140, the UE reports the downlink positioning measurement results based on the PRS to the network, and/or receives the uplink positioning measurement results or location information based on the SRS transmitted by the network.

With the above method, the UE can realize the uplink positioning measurement and the downlink positioning measurement in the RRC unconnected state, which saves a lot of signaling overhead, reduces network delay, and greatly improves the efficiency of network and equipment. And because the uplink positioning measurement and the downlink positioning measurement can be realized at the same time, the result of positioning is more accurate. In addition, since the UE performs the operations related to positioning measurement only after acquiring the trigger information, and does not need to wake up periodically to perform the operations related to positioning measurement, so it's more flexible for the UE to perform the operations related to positioning measurement in the RRC unconnected state.

The above is a description of some implementations of the positioning measurement method performed by the user equipment provided by the embodiment of this disclosure. It can be understood that the implementations of the positioning measurement method performed by the user equipment provided by the embodiment of this disclosure are not limited to the above, and the combination, omission and deformation of any steps belong to the scope to be protected by this disclosure. Various technical details of the method performed by the user equipment in the RRC unconnected state provided by the embodiment of the disclosure will be described in detail below.

First, the UE acquiring the configuration information of the reference signal for positioning measurement in step S410 will be described in detail below. It should be noted that the following description takes the UE acquiring the configuration information of a PRS (or an SRS for positioning measurement) as an example, but it can be understood that the following description is only an exemplary description, and this disclosure is not limited to this. A PRS is described as an implementation of the first signal, and an SRS for positioning measurement is described as an implementation of the second signal.

In the existing system, a PRS for downlink positioning measurement is configured by the location management function (LMF) entity of the core network, that is, the configuration information of the PRS is transparently transmitted to the base station on the RAN side, while an SRS for uplink positioning measurement is configured by the base station on the RAN side through RRC signaling. For convenience of brief description, an SRS for the uplink positioning measurement is called an POS-SRS (positioning SRS) in this disclosure.

Similar to the positioning measurement in the RRC connected state in the existing system, the positioning measurement in the RRC unconnected state can reuse the same PRS (or POS-SRS) configuration information, but the way for a UE to obtain the PRS (or POS-SRS) configuration information may be slightly different. For positioning measurement in the RRC connected state, the UE acquires the PRS configuration information through core network information transparently transmitted by the RAN side and the POS-SRS configuration information through UE-specific RRC signaling in RRC connected state.

Optionally, the UE in the RRC unconnected state acquires the configuration information of the PRS (or POS-SRS) through system information. The advantageous effect of this method is that the UE can acquire the configuration information of the PRS (or POS-SRS) without entering the RRC connected state, thus saving signaling overhead and reducing UE power consumption. For example, the UE in the RRC unconnected state acquires the configuration information of the PRS (or POS-SRS) in the system information block dedicated for positioning. The PRS (or POS-SRS) configured through the system information can be used for all UEs with positioning function in the cell, that is, all UEs in the cell use the same PRS (or POS-SRS) configuration information.

Optionally, the UE acquires the configuration information of the PRS (or POS-SRS) in the RRC connected state and retains the configuration information for use in the RRC unconnected state, that is, after the UE releases an RRC connection, the acquired configuration information of the PRS (or POS-SRS) cannot be released, but continues to be retained.

In an example, the positioning measurement in the RRC connected state and the positioning measurement in the RRC unconnected state can share the same PRS (or POS-SRS) configuration information. The PRS (or POS-SRS) configuration information used for positioning measurement in the RRC connected state can be used for positioning measurement in the RRC unconnected state by default, or whether the PRS (or POS-SRS) configuration information used for positioning measurement in the RRC unconnected state can be used for positioning measurement is indicated by additional signaling. The advantageous effect of this method lies in that the overhead of RRC signaling can be reduced.

In another example, different PRS (or POS-SRS) configuration information is used for positioning measurement in the RRC connected state and the RRC unconnected state, that is, the PRS (or POS-SRS) configuration information for positioning measurement in the RRC unconnected state is configured separately. The advantageous effect of this method is that configuration with enough flexibility can be provided.

In another example, the positioning measurement in the RRC connected state shares part of the same PRS (or POS-SRS) configuration information and uses part of different PRS (or POS-SRS) configuration information. For example, the positioning measurement in the RRC connected state and the positioning measurement in the RRC unconnected state can use different PRS (or POS-SRS) periodicity, and the same configuration can be used for other parameters. That is, in addition to the existing configuration information for positioning measurement in the RRC connected state, the network only needs to configure additional partial parameters for positioning measurement in the RRC unconnected state. The advantage of this method is that it can provide configuration with a certain degree of flexibility while saving a certain amount of signaling overhead.

Optionally, the UE acquires the PRS (or POS-SRS) configuration information used in the RRC unconnected state through an RRC Release message, which is the last RRC message during the UE switching from the RRC connected state to the RRC unconnected state. After releasing an RRC connection, the UE retains the PRS (or POS-SRS) configuration information for use in the RRC unconnected state.

The following is a detailed description of determining whether the cell where the UE newly camps belongs to the applicable range of the acquired configuration information of the reference signal for positioning measurement in step S910. It should be noted that the application range of configuration information of the PRS (or POS-SRS) is taken as an example to explain below, but it can be understood that the following description is only an exemplary explanation, and the disclosure is not limited to this.

Optionally, when the camped cell of the UE changes, if the newly camped cell and the cell where the UE previously located while acquiring the PRS (or POS-SRS) configuration information belong to different tracking area (TA), the PRS (or POS-SRS) configuration information previously acquired by the UE is invalid, that is, the PRS (or POS-SRS) configuration information cannot be used in the newly camped cell. On the contrary, the PRS (or POS-SRS) configuration information previously acquired by the UE is still available in the newly camped cell. That is, the applicable range of PRS (or POS-SRS) configuration information is the same TA.

Here, the tracking area TA refers to a free moving area where the UE does not need to update the service of the UE. The function of TA is to manage the terminal location, which can be divided into paging management and location update management. The TA is a cell-level configuration, and multiple cells can be configured with the same TA, and one cell can only belong to one TA.

Optionally, when the camped cell of the UE changes, if the newly camped cell and the cell where the UE previously located while acquiring the PRS (or POS-SRS) configuration information belong to management areas of different LMFs, the PRS (or POS-SRS) configuration information previously acquired by the UE is invalid, that is, the PRS (or POS-SRS) configuration information cannot be used in the newly camped cell. On the contrary, the PRS (or POS-SRS) configuration information previously acquired by the UE is still available in the newly camped cell. That is, the applicable range of the PRS (or POS-SRS) configuration information is the management area of the same LMF.

Here, the management area of an LMF refers to the management area of one LMF entity, and one LMF entity can manage one or more cells. The management area of an LMF is cell-level configuration. Multiple cells can be configured with the same LMF entity, and one cell can only belong to one LMF entity. In an example, which LMF entity manages the cell can be configured to the UE. For example, the network indicates the LMF number to which the cell belongs through system information, and the UE can judge whether the LMF to which the newly camped cell belongs has changed from the LMF to which the previously camped cell belongs. In another example, the management area of the LMF entity includes which cells can be configured for the UE. For example, the network indicates the physical cell ID included in the management area of the current LMF to the UE, and the UE can judge whether the newly camped cell belongs to the management area of the current LMF.

Optionally, the PRS (or POS-SRS) configuration information can be associated with one or more cells. When the camped cell of the UE changes, if the newly camped cell does not belong to the cell associated with the PRS (or POS-SRS) configuration information, the PRS configuration information previously acquired by the UE is invalid, that is, the PRS configuration information cannot be used in the newly camped cell; otherwise, the PRS configuration information previously acquired by the UE is still applicable in the newly camped cell. That is, the applicable range of the PRS (or POS-SRS) configuration information is the cells associated with PRS (or POS-SRS) configuration information.

Here, the cells associated with the PRS configuration information refer to the corresponding cells of a plurality of base stations actually transmitting the PRS, that is, the PRS received by the UE comes from the base stations of these cells. The existing PRS configuration information contains the indication information, that is, a group of physical cell IDs contained in the PRS configuration information, and the PRS configuration information also contains the SSB information of each corresponding cell, and each PRS can be configured to be associated with the SSB of one of the cells. The cells associated with the POS-SRS configuration information refer to the corresponding cells of multiple base stations that actually receive the SRS, that is, the POS-SRS transmitted by the UE is received by base stations of these cells. The existing POS-SRS configuration information does not contain this indication information, which can be introduced into the new version of the standard.

Optionally, as long as the camped cell of the UE changes, whether the newly camped cell belongs to the same TA or the management area of the same LMF with the cell from which the PRS (or POS-SRS) configuration information was previously acquired, or whether the newly camped cell is the cell associated with the PRS (or POS-SRS) configuration information, the PRS (or POS-SRS) configuration information acquired by the UE from the previously camped cell may be invalid, that is, the PRS (or POS-SRS) configuration information cannot be used in the newly camped cell, and the UE needs to acquires new PRS (or POS-SRS) configuration information in the newly camped cell. That is, the applicable range of the PRS (or POS-SRS) configuration information is the same cell.

In the above example, if the UE judges that the PRS (or POS-SRS) configuration information is invalid, the UE needs to acquire new PRS (or POS-SRS) configuration information. In the way that UE acquires the PRS (or POS-SRS) configuration information in the RRC connected state, the UE needs to establish RRC connected state in the newly camped cell to request new PRS (or POS-SRS) configuration. In the way that the UE acquires the PRS (or POS-SRS) configuration information through system information, the UE needs to read system information in the newly camped cell to acquire new PRS (or POS-SRS) configuration information.

The following describes in detail the use of SSB for assisting in PRS positioning measurement in step S1010 and step S1020.

Optionally, besides measuring PRS when the UE is in the RRC unconnected state, SSB can also be used to assist in positioning measurement. In the existing system, one PRS can be configured to have a quasi-colocation (QCL) relationship with a certain SSB. The QCL refers to a case where signals transmitted from two different antenna ports experience radio channels with the same characteristics. This SSB may or may not be the SSB of a serving cell, for example, this SSB may be the SSB of a neighboring cell. Whether an SSB with QCL relationship with a PRS can be used to assist in positioning measurement is network configurable, for example, the SSB with QCL relationship with a PRS is indicated together in PRS configuration information.

In addition, if the UE can use SSB to assist PRS for positioning measurement, the UE needs to know a power offset of energy per resource element (EPRE) between the PRS and the corresponding SSB, which can be predefined or preconfigured.

The related contents of acquiring trigger information in step S430 will be described in detail below. It should be noted that the following description takes the related contents of UE acquiring trigger information of downlink positioning measurement and/or acquiring trigger information transmitted by an POS-SRS as an example, but it can be understood that the following description is only an exemplary explanation, and this disclosure is not limited to this.

In some implementations, the UE configured with a PRS (or POS-SRS) starts to perform operations related to positioning after entering the RRC unconnected state (that is, after releasing the RRC connection) by default, for example, receiving PRS to perform downlink positioning measurement, reporting downlink positioning measurement results, and/or transmitting a POS-SRS. In an example, the UE configured with a PRS (or POS-SRS) wakes up periodically to perform operations related to positioning after entering the RRC unconnected state by default until entering the RRC connected state, that is, the UE periodically performs operations related to positioning during the duration of the RRC unconnected state; in another example, the UE configured with a PRS (or POS-SRS) wakes up periodically to perform operations related to positioning after entering the RRC unconnected state by default until the preconfigured timer for positioning expires, that is, the UE only periodically performs operations related to positioning within a certain period of time in the RRC unconnected state.

In other implementations, the UE needs to acquire trigger information of positioning measurement to determine when to perform operations related to positioning measurement.

(1) A UE acquires trigger information through an RRC Release message.

Optionally, the UE acquires trigger information of downlink positioning measurement (or POS-SRS transmission) in the RRC unconnected state through the RRC Release message, which is the last RRC message received by the UE in the RRC connected state. That is, the RRC Release message indicates that the UE enters the RRC unconnected state, and if the RRC Release message contains the trigger information, the UE performs downlink positioning measurement or POS-SRS transmission in the RRC unconnected state; if the trigger information is not contained in the RRC Release message, the UE may not perform downlink positioning measurement or POS-SRS transmission in the RRC unconnected state, even if the UE is configured with a PRS or POS-SRS.

In an example, the trigger information contained in the RRC Release message indicates that the UE periodically performs downlink positioning measurement or POS-SRS transmission within a period of time after entering the RRC unconnected state, and then the UE may initiate a random access procedure and re-enter the RRC connected state to continue data transmission. The length of time for performing downlink positioning measurement or POS-SRS transmission is preconfigured. In another example, the trigger information contained in the RRC Release message indicates that the UE periodically performs downlink positioning measurement with a period of time after entering the RRC unconnected state, and then the UE can continue to remain in the RRC unconnected state. The length of time for performing downlink positioning measurement or POS-SRS transmission is preconfigured.

In yet another example, the trigger information contained in the RRC Release message indicates that the UE periodically performs downlink positioning measurement or POS-SRS transmission after entering the RRC unconnected state until the UE re-enters the RRC connected state.

(2) A UE in the RRC unconnected state acquires trigger information through a paging PDCCH or PDSCH.

Optionally, the UE in the RRC unconnected state acquires the trigger information of downlink positioning measurement or POS-SRS transmission through a paging PDCCH or PDSCH, that is, the paging PDCCH or PDSCH contains trigger information indicating the UE in the RRC unconnected state to perform downlink positioning measurement or POS-SR transmission. If the UE receives trigger information indicating downlink positioning measurement at one paging occasion (PO), the UE may receive preconfigured PRS to perform downlink positioning measurement and report the positioning measurement results to the network, and then return to a sleep state. If the UE receives trigger information indicating POS-SRS transmission at one paging opportunity, the UE may transmit the preconfigured POS-SRS, and then return to a sleep state.

Either of the following methods can be used to acquire trigger information of downlink positioning measurement or POS-SRS transmission through a paging PDCCH or PDSCH:

(a) DCI carried by the paging PDCCH contains one indication field, which is used to indicate the UE configured with a PRS or POS-SRS to perform the downlink positioning measurement or POS-SRS transmission;

(b) The paging PDSCH contains one MAC CE, which is used to indicate the UE configured with a PRS or POS-SRS to perform the downlink positioning measurement or POS-SRS transmission; and (c) The paging message carried by the paging PDSCH contains one indication information for indicating the paged UE to perform the downlink positioning measurement or POS-SRS transmission, and the indication information is contained in the paging message together with the temporary mobile subscriber identity (TMSI) of the paged UE. In other words, the system introduces a new paging purpose for the paging message, that is, waking up the UE in the RRC unconnected state to perform the downlink positioning measurement or POS-SRS transmission.

(3) A UE in the RRC unconnected state acquires trigger information through a dedicated physical channel or signal.

Optionally, the UE acquires the trigger information of the downlink positioning measurement or POS-SRS transmission through a dedicated physical channel or signal, which can be any one of the following:
  (a) carrying the trigger information of the downlink positioning measurement or POS-SR transmission through a dedicated physical sequence signal. The resources for the transmission of the physical sequence signal are preconfigured;
  (b) carrying the trigger information of the downlink positioning measurement or POS-SR transmission through dedicated DCI. The resources for monitoring the search space of the DCI are preconfigured;
  (c) carrying the trigger information of the downlink positioning measurement or POS-SR transmission through a preconfigured PDSCH. The resources for the PDSCH transmission are preconfigured; and
  (d) carrying the trigger information of the downlink positioning measurement or POS-SRS transmission through the dynamically scheduled PDSCH by DCI scheduling. The resources for monitoring the search space of the DCI scheduling the PDSCH are preconfigured.

Optionally, the physical resources (including time-frequency domain resources, for example) of the dedicated physical channel or signal for carrying the trigger information of the downlink positioning measurement or POS-SR transmission can be preconfigured, and the physical resources are periodically repeated in time. The trigger information has some correspondences with the PRS (or POS-SRS), and the UE only performs the instruction of trigger information for the corresponding PRS (or POS-SRS). The trigger information indicating the downlink positioning measurement can indicate the UE to receive a corresponding PRS and perform the downlink positioning measurement, or the trigger information indicating the POS-SRS transmission can indicate the UE to transmit the corresponding POS-SRS.

The UE may determine the PRS (or POS-SRS) corresponding to each trigger information according to a predefined correspondence criterion. For example, trigger information within a periodicity corresponds to all PRSs (or POS-SRSs) within one time window, the size of which is the periodicity of the trigger information, and the start position of the time window is a position satisfying a certain interval after the trigger information, the size of the interval is related to the receiving and processing time of the trigger information and/or the receiving and preparation time of the PRS (or POS-SRS). The size of the interval can be predefined or preconfigured.

Optionally, the time domain position of the dedicated physical channel or signal used to carry the trigger information of the downlink positioning measurement or POS-SR transmission is related to the time domain positions of the paging opportunity, SSB, PRS or POS-SRS. For example, the UE monitors the trigger information indicating the downlink positioning measurement or POS-SRS transmission at a position or within a window satisfying a certain interval after the paging opportunity PO.

The size of the interval can be preconfigured or indicated by the PO, that is, the trigger information for indicating the downlink positioning measurement or POS-SRS transmission has a corresponding relationship with the PO, and the PO can also indicate whether to monitor the corresponding trigger information; or, the UE monitors the trigger information for indicating the downlink positioning measurement or POS-SRS transmission at a position or within a window satisfying a preconfigured interval before or after the synchronization signal block (SSB), that is, the trigger information for indicating the downlink positioning measurement or POS-SRS transmission has a corresponding relationship with the SSB; or, the UE monitors the trigger information for indicating the downlink positioning measurement at a position or within a window satisfying a preconfigured interval before the preconfigured PRS, that is, the trigger information for indicating the downlink positioning measurement has a corresponding relationship with the PRS; or, the UE monitors the trigger information for indicating the POS-SRS transmission at a position or within a window satisfying a preconfigured interval before the preconfigured POS-SRS, that is, the trigger information for indicating the POS-SRS transmission has a corresponding relationship with the POS-SRS.

In an example, the UE periodically monitors the trigger information for indicating the downlink positioning measurement or POS-SRS transmission at a specific time-domain position, that is, the trigger information has only one transmission opportunity within one periodicity, and the time-domain position is determined by the time-domain positions of PO, SSB, PRS or POS-SRS. For example, the interval between the time-domain position and the time-domain positions of PO, SSB, PRS, or POS-SRS is predefined, preconfigured or indicated in the PO.

In another example, the UE periodically monitors the trigger information indicating the downlink positioning measurement or POS-SRS transmission within a specific time window, that is, the trigger information may have multiple transmission opportunities within one periodicity, for example, the trigger information may have multiple periodic transmission opportunities within one time window, and the start position or end position of the time window is determined by the time domain positions of PO, SSB, PRS, or POS-SRS. For example, the interval between the start position or end position of the time window and the time domain positions of PO, SSB, PRS, or POS-SRS is predefined, preconfigured, or indicated in PO. In addition, the length of the window may be predefined or preconfigured.

Optionally, the UE monitors the trigger information for indicating the downlink positioning measurement or POS-SRS transmission once after each PO (or SSB), that is, one PO (or SSB) corresponds to one piece of trigger information, and the time domain position or window position for the trigger information transmission is determined by the time domain position of the corresponding PO (or SSB).

Optionally, the UE monitors the trigger information for indicating the downlink positioning measurement or POS-SRS transmission once every multiple POs (or SSBs), that is, multiple POs (or SSBs) correspond to one piece of trigger information, and the time domain position or window position for the trigger information transmission is determined by the time domain position of the last PO (or SSB) among the corresponding multiple POs (or SSBs).

Optionally, the UE monitors the trigger information for indicating the downlink positioning measurement or POS-SRS transmission several times in one PO (or SSB) periodicity, that is, one PO (or SSB) corresponds to multiple pieces of periodic trigger information, and the time domain position or window position of the trigger information in the first periodicity among these multiple periodicities is determined by the time domain position of the corresponding PO (or SSB).

Figure 15A:
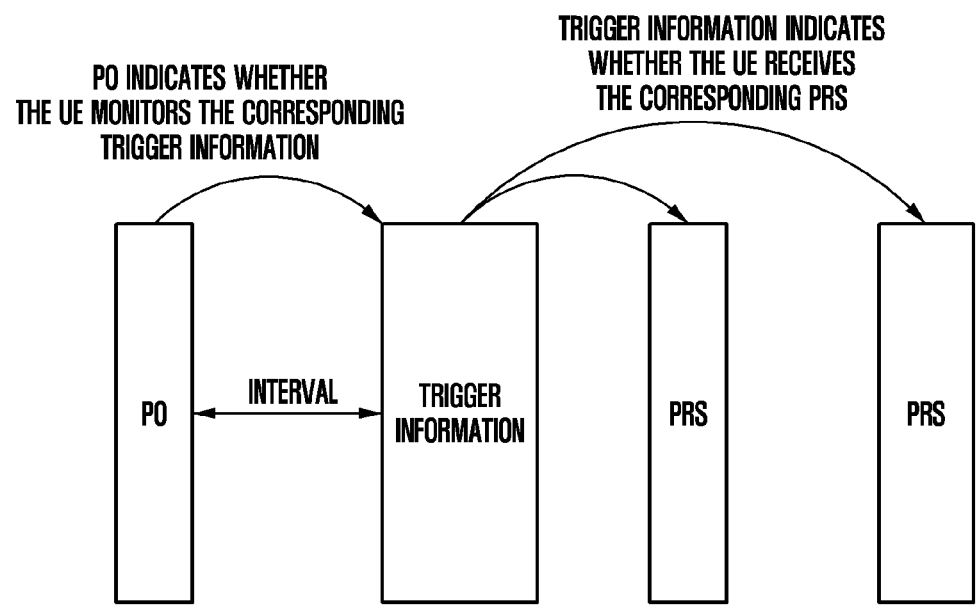
FIG. 15A illustrates schematic diagrams of an example corresponding relationship between paging opportunities (PO) and trigger information according to an embodiment of the disclosure.
Figure 15B:
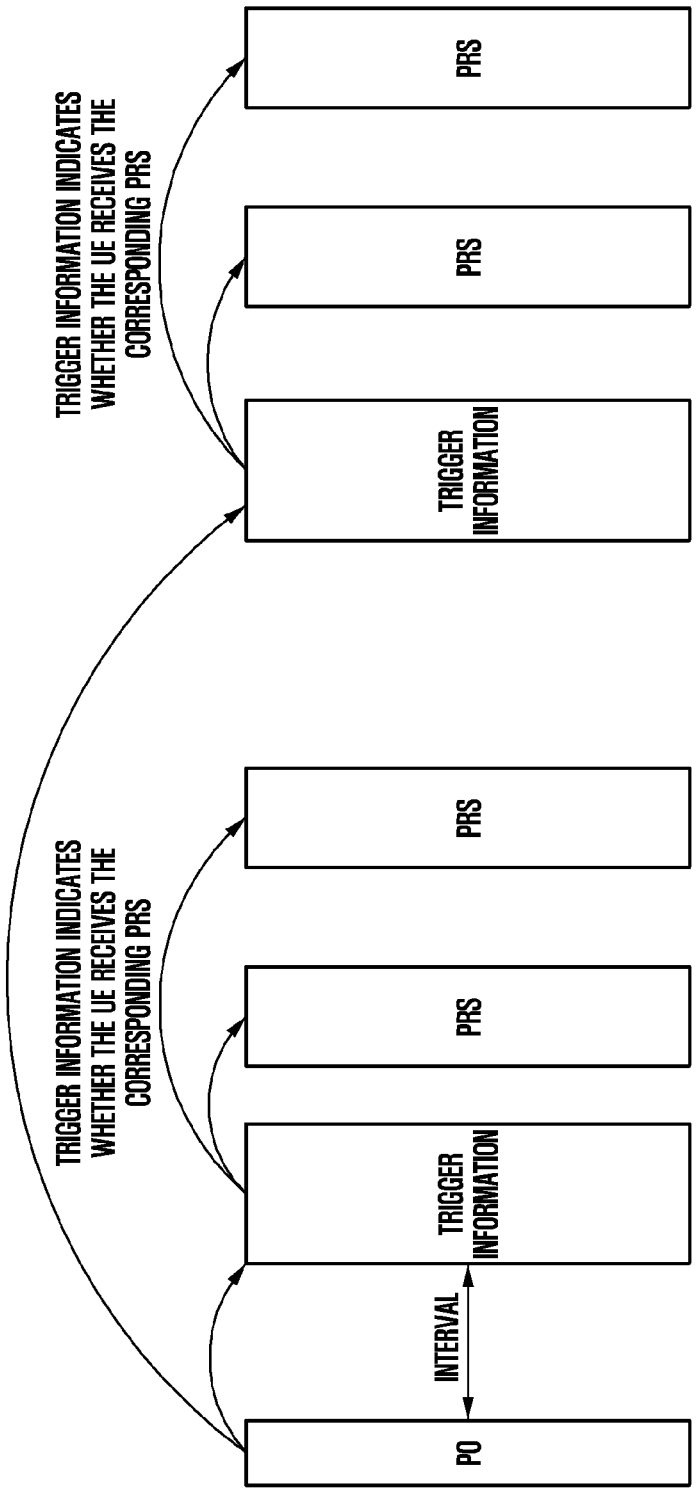
FIG. 15B illustrates schematic diagrams of an example corresponding relationship between paging opportunities (PO) and trigger information according to an embodiment of the disclosure.

FIG. 15A to FIG. 15B respectively illustrate schematic diagrams of an example corresponding relationship between paging opportunities (PO) and trigger information according to an embodiment of the disclosure.

For example, in FIG. 15A, one PO corresponds to one piece of trigger information, and the PO may indicate whether the UE monitors the corresponding trigger information. The interval between the end position of the PO of the trigger information and the start position of the corresponding trigger information may be predefined, preconfigured or indicated in the PO.

In an example, there is one piece of corresponding trigger information after every PO, in other words, the transmission periodicity of the trigger information is equal to that of the PO. In another example, there is a piece of corresponding trigger information after every multiple POs, that is, the UE monitors the trigger information at the position satisfying an interval after the last PO among these multiple POs, in other words, the transmission periodicity of the trigger information is equal to a multiple of the transmission periodicity of the PO.

If the PO is not monitored by the UE or if the PO is monitored by the UE and the PO indicates no corresponding trigger information needs to be monitored by the UE, the UE does not need to monitor the corresponding trigger information; if the PO is monitored by the UE and the PO indicates the corresponding trigger information needs to be monitored by the UE, the UE needs to monitor the corresponding trigger information.

In FIG. 15B, one PO corresponds to trigger information in multiple periodicities, and the PO may indicate whether the UE monitors trigger information in the multiple corresponding periodicities or indicate whether the UE monitors one or more pieces of the trigger information in the multiple corresponding periodicities. The interval between the end position of the PO and the start position of the trigger information in the first periodicity in the multiple corresponding periodicities can be predefined, preconfigured or indicated in the PO, and the time domain positions of trigger information in other periodicities are determined according to the time domain position of the trigger information in the first periodicity and the transmission periodicity of the trigger information.

If the PO is not monitored by the UE or if the PO is monitored by the UE and the PO indicates no trigger information in the multiple corresponding periodicities needs to be monitored by the UE, the UE does not need to monitor the trigger information in the multiple corresponding periodicities; if the PO is monitored by the UE and the PO indicates the trigger information in the multiple corresponding periodicities needs to be monitored by the UE, the UE needs to monitor the trigger information in the multiple corresponding periodicities.

In the above-mentioned FIGS. 15A to 15B, the time-domain position for trigger information transmission is determined by the time-domain position of the corresponding PO, and the same applies to the SSB, that is, the time-domain position for the trigger information transmission is determined by the time-domain position of the corresponding SSB, which is not repeated here. In addition, FIG. 15A to FIG. 15B are also applicable to the case of monitoring trigger information within one time window, that is, the time-domain position of the time window for monitoring the trigger information is determined by the time-domain position of the corresponding PO or SSB, which is not repeated here.

In the existing system, PRS (or POS-SRS) configuration information includes configuration information of multiple groups of PRSs (or POS-SRSs), one group of PRSs (or POS-SRSs) can contain multiple PRSs (or POS-SRSs), multiple PRSs (or POS-SRSs) within one group of PRSs (or POS-SRSs) have the same periodicity, and different groups of PRSs (or POS-SRSs) may have different periodicity Optionally, the PRS (or POS-SRS) within one periodicity corresponds to one piece of trigger information indicating whether the UE receives the corresponding PRS or whether the UE transmits the corresponding POS-SRS. The time domain position for the trigger information transmission can be determined by the time domain position of the corresponding PRS (or POS-SRS).

Optionally, the PRSs (POS-SRSs) in multiple periodicities correspond to one piece of trigger information, which indicates whether the UE receives the PRSs in the multiple periodicities or one or more of the PRSs in the multiple periodicities; or the trigger information indicates whether the UE transmits POS-SRSs in the multiple periodicities or whether to transmit one or more of the POS-SRSs in the multiple periodicities. The number of the periodicities is predefined or preconfigured. The time-domain position for the trigger information transmission can be determined by the time-domain position of the PRS (or POS-SRS) in the first periodicity of the multiple corresponding periodicities.

Optionally, one group of PRSs (or POS-SRSs) in one periodicity correspond to one piece of trigger information, and one group of PRSs (or POS-SRSs) contain multiple PRSs (POS-SRSs), and the trigger information indicates whether the UE receives one group of PRSs in this periodicity or one or more of one group of PRSs in this periodicity; or, the trigger information indicates whether the UE transmits one group of POS-SRSs in this periodicity or whether to transmit one or more of one group of POS-SRSs in this periodicity. The time-domain position for the trigger information transmission can be determined by the time-domain position of the first PRS (or POS-SRS) in one group of PRSs (or POS-SRSs) within the corresponding periodicity.

Optionally, one group of PRSs (POS-SRSs) in multiple periodicities correspond to one piece of trigger information, the trigger information indicating whether the UE receives one group of PRSs in the multiple periodicities or one or more of one group of PRSs in the multiple periodicities; or, the trigger information indicates whether the UE transmits one group of POS-SRSs in the multiple periodicities or whether to transmit one or more PRSs of one group of POS-SRSs in the multiple periodicities. The number of the periodicities is predefined or preconfigured. The time-domain location for the trigger information transmission can be determined by the time-domain location of the first PRS (or POS-SRS) in one group of PRSs (or POS-SRSs) in the first periodicity of the multiple periodicities.

Optionally, multiple groups of PRSs (POS-SRSs) correspond to one piece of trigger information, the trigger information indicating whether the UE receives the multiple groups of PRSs or one or more of the multiple groups of PRSs; or the trigger information indicates whether the UE transmits the multiple groups of POS-SRSs or whether to transmit one or more of the multiple groups of POS-SRSs. The time domain position for the trigger information transmission may be determined by the time domain position of the first PRS (or POS-RS) in the first group of PRSs (or POS-RSs) among the multiple groups of PRSs (or POS-RSs).

FIG. 16A to FIG. 16F, which respectively illustrate schematic diagrams of an example corresponding relationship between positioning reference signals PRSs and trigger information according to an embodiment of the disclosure.

Figure 16A:
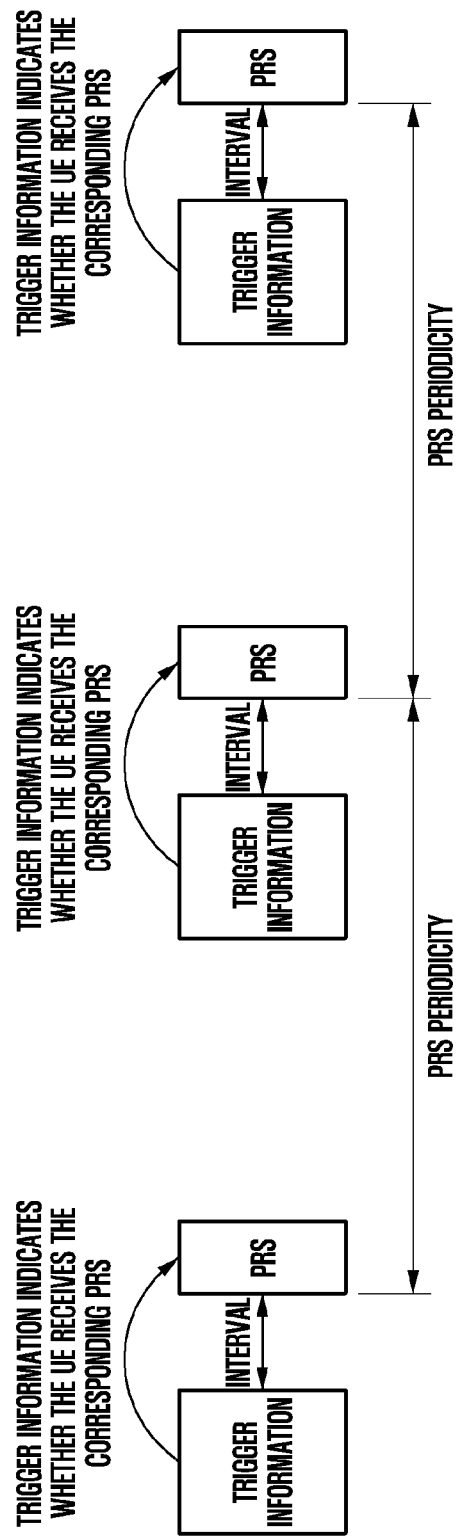
FIG. 16A illustrates schematic diagrams of an example corresponding relationship between positioning reference signals PRSs and trigger information according to an embodiment of the disclosure.

For example, in FIG. 16A, a PRS in one periodicity corresponds to one piece of trigger information, the trigger information is used to indicate whether the UE receives the corresponding PRS, and the interval between the end position of the trigger information transmission and the start position of the corresponding PRS is predefined or preconfigured, or the interval between the start position of the trigger information transmission and the start position of the corresponding PRS is predefined or preconfigured.

Figure 16B:
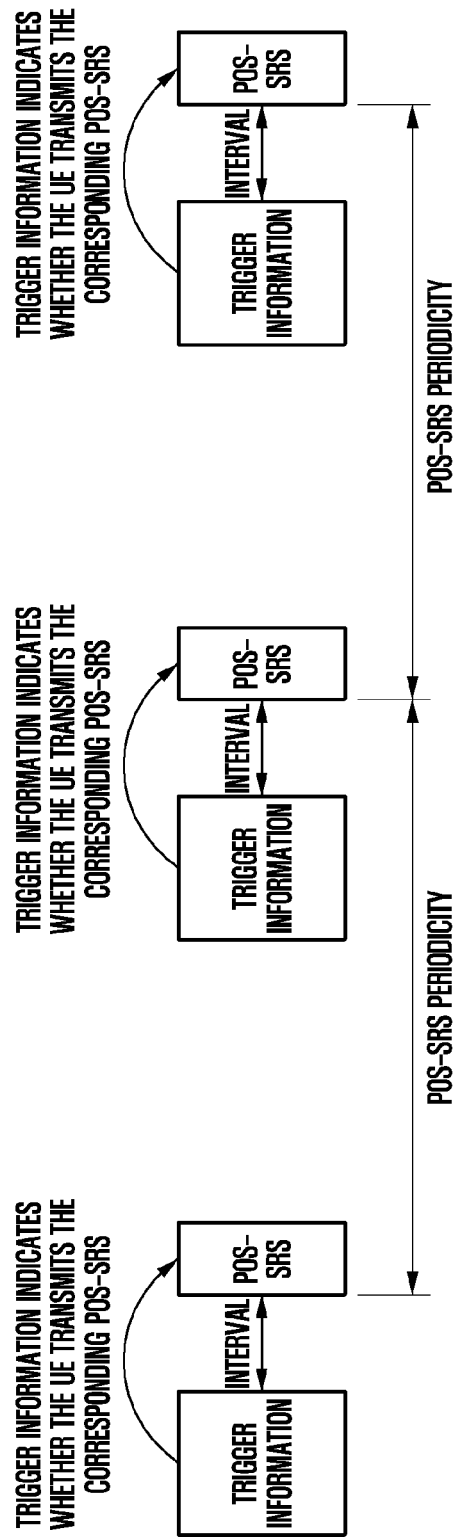
FIG. 16B illustrates schematic diagrams of an example corresponding relationship between positioning reference signals PRSs and trigger information according to an embodiment of the disclosure.

In FIG. 16B, the POS-SRS in one periodicity corresponds to one piece of trigger information, the trigger information is used to indicate whether the UE transmits the corresponding POS-SRS. The interval between the end position of the trigger information transmission and the start position of the corresponding POS-SRS is predefined or preconfigured, or the interval between the start position of the trigger information transmission and the start position of the corresponding POS-SRS is predefined or preconfigured.

Figure 16C:
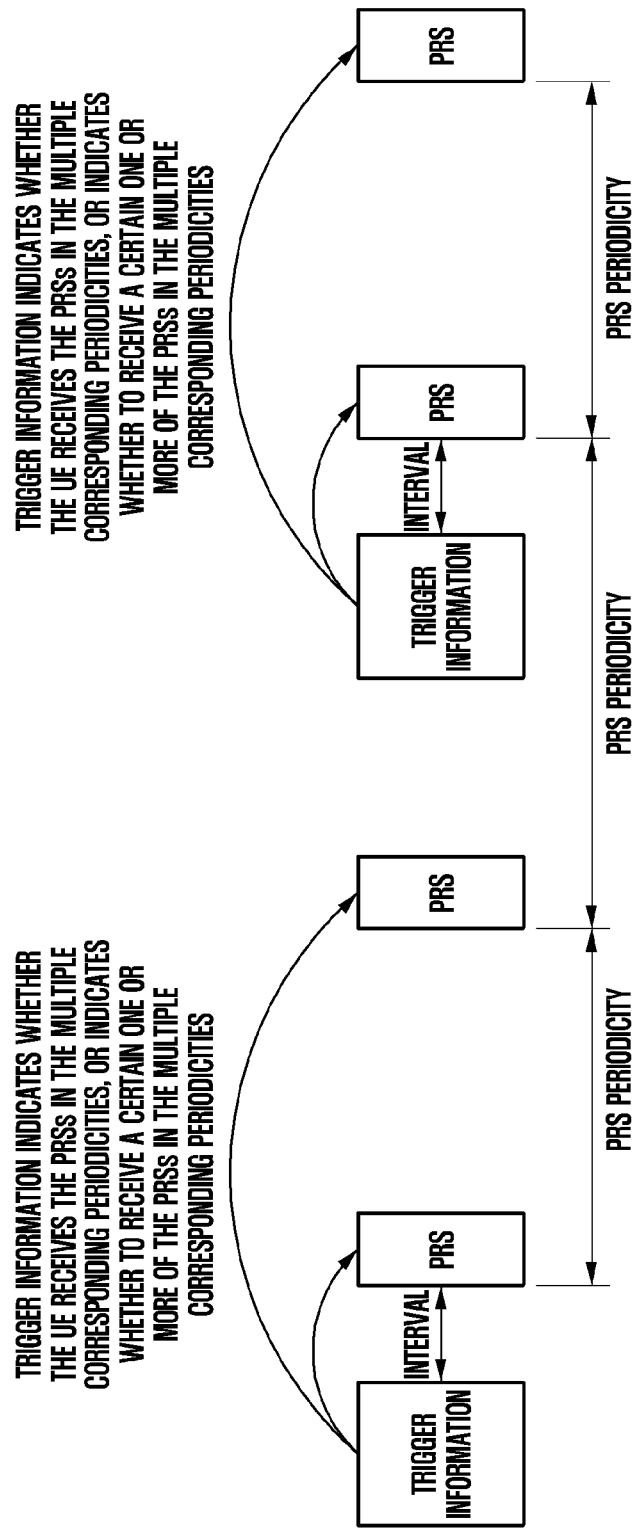
FIG. 16C illustrates schematic diagrams of an example corresponding relationship between positioning reference signals PRSs and trigger information according to an embodiment of the disclosure.

In FIG. 16C, PRSs in N (e.g., N=2) periodicities correspond to one piece of trigger information, the trigger information is used to indicate whether the UE receives the PRSs in N corresponding periodicities or whether the UE receives one or more of the PRSs in N corresponding periodicities, and the interval between the end position of the trigger information transmission and the start position of the PRS in the first periodicity of the N corresponding periodicities is predefined or preconfigured, or the interval between the start position of the trigger information transmission and the start position of the PRS in the first periodicity of the N corresponding periodicities is predefined or preconfigured.

Figure 16D:
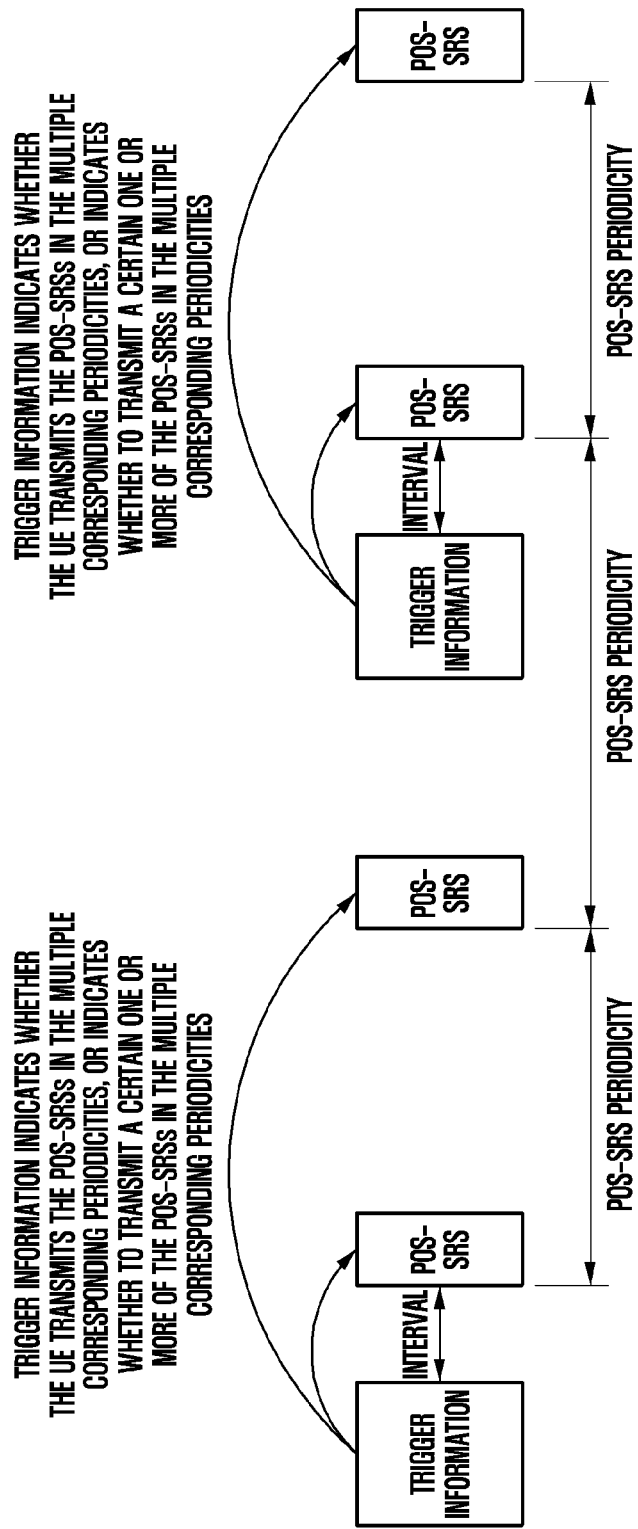
FIG. 16D illustrates schematic diagrams of an example corresponding relationship between positioning reference signals PRSs and trigger information according to an embodiment of the disclosure.

In FIG. 16D, POS-SRSs in N (e.g., N=2) periodicities correspond to one piece of trigger information, the trigger information is used to indicate whether the UE transmits the POS-SRSs in N corresponding periodicities or whether the UE transmits one or more of the POS-SRSs in N corresponding periodicities, and the interval between the end position of the trigger information transmission and the start position of the POS-SRS in the first periodicity of the N corresponding periodicities is predefined or preconfigured, or the interval between the start position of the trigger information transmission and the start position of the POS-SRS in the first periodicity of the N corresponding periodicities is predefined or preconfigured.

Figure 16E:
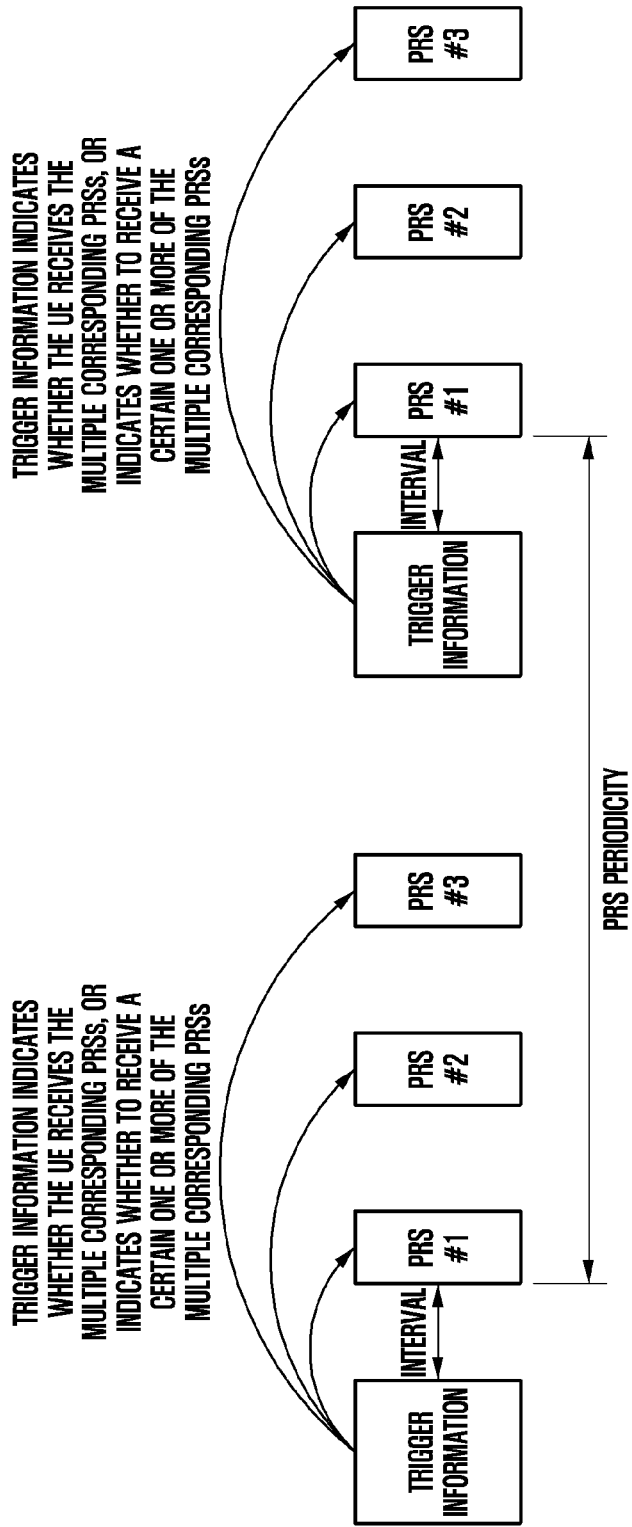
FIG. 16E illustrates schematic diagrams of an example corresponding relationship between positioning reference signals PRSs and trigger information according to an embodiment of the disclosure.

In FIG. 16E, M (e.g., M=2) PRSs in one periodicity correspond to one piece of trigger information, the trigger information is used to indicate whether the UE receives the corresponding M PRSs or whether the UE receives one or more of the corresponding M PRSs, and the interval between the end position of the trigger information transmission and the start position of the first (PRS #1) of the corresponding M PRSs is predefined or preconfigured, or the interval between the start position of the trigger information transmission and the start position of the first (PRS #1) of the corresponding M PRSs is predefined or preconfigured.

Figure 16F:
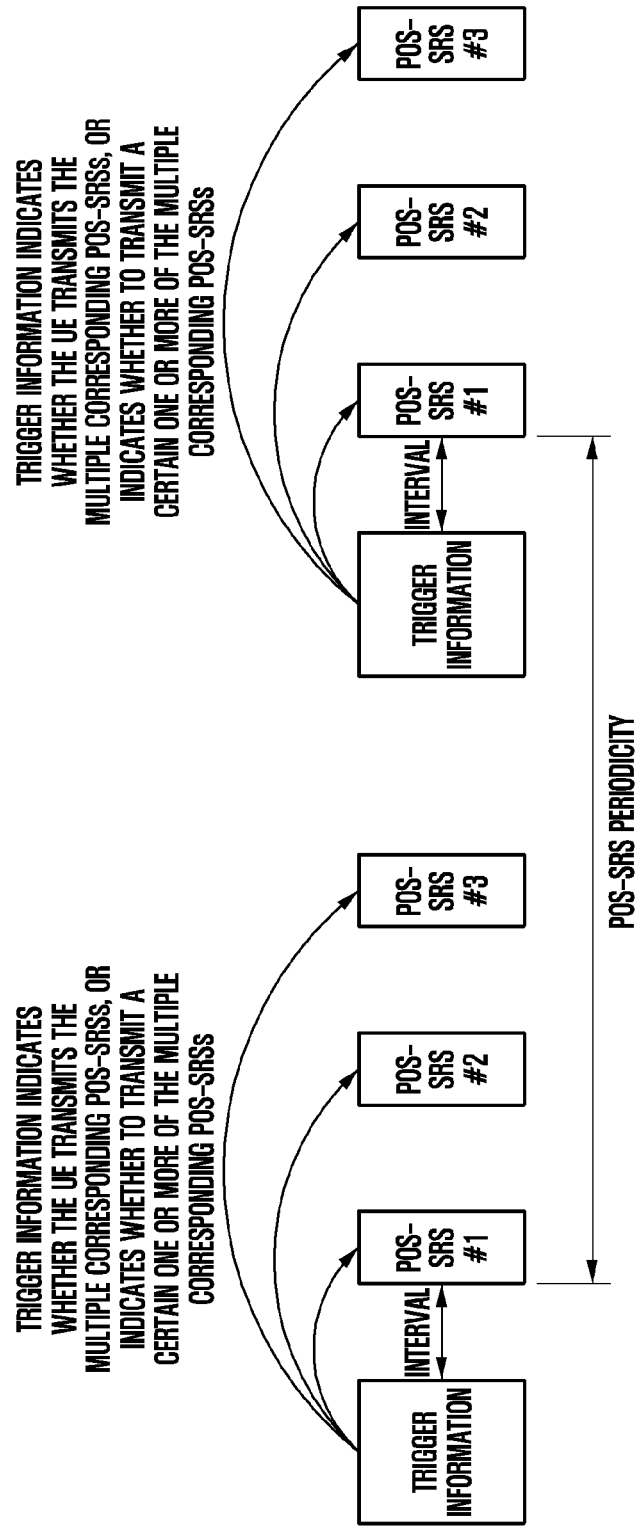
FIG. 16F illustrates schematic diagrams of an example corresponding relationship between positioning reference signals PRSs and trigger information according to an embodiment of the disclosure.

In FIG. 16F, POS-SRSs in M (e.g., M=2) periodicities correspond to one piece of trigger information, the trigger information is used to indicate whether the UE transmits the M corresponding POS-SRSs or whether the UE transmits one or more of the M corresponding POS-SRSs, and the interval between the end position of the trigger information transmission and the start position of the first (POS-SRS #1) of the M corresponding POS-SRSs is predefined or preconfigured, or the interval between the start position of the trigger information transmission and the start position of the first (POS-SRS #1) of the M corresponding PRSs is predefined or preconfigured.

In the above-mentioned FIGS. 16A to 16F, the time-domain position for the trigger information transmission is determined by the time-domain position of the corresponding PRS or POS-SRS, which is also applicable to the case of monitoring trigger information within one time window, that is, the time-domain position of the time window for monitoring the trigger information is determined by the time-domain position of the corresponding PRS or POS-SRS, which may not be repeated here.

The UE in the RRC unconnected state may wake up periodically to monitor the above trigger information, and whether the trigger information is monitored can correspond to different UE behaviors. If the trigger information indicating the downlink positioning measurement is monitored by the UE, the UE may receive the preconfigured PRS, and the UE may not return to sleep until the UE completes the downlink positioning measurement and reports the downlink positioning measurement results to the network. If the trigger information indicating the downlink positioning measurement is not monitored by the UE, the UE can directly return to the sleep state without receiving the PRS. If the trigger information indicating the POS-SRS transmission is monitored by the UE, the UE may transmit the preconfigured POS-SRS, and then return to the sleep state. If the trigger information indicating the POS-SRS transmission is not monitored by the UE, the UE can directly return to the sleep state without transmitting the POS-SRS.

The related contents of the trigger information in step S430 will be described in detail below. It should be noted that the following description takes the specific contents contained in the trigger information indicating the downlink positioning measurement or POS-SRS transmission as an example, but it can be understood that the following description is only an exemplary explanation, and this disclosure is not limited to this.

Optionally, the above trigger information may indicate all UEs configured with PRS or POS-SRS in the cell to perform the downlink positioning measurement or POS-SRS transmission. For example, all UE monitoring the paging opportunity and configured with the PRS or POS-SRS can be indicated to perform downlink positioning measurement or POS-SRS transmission through the trigger information carried by the DCI of a paging PDCCH or the trigger information carried by the MAC CE included in a paging PDSCH.

Optionally, the above trigger information may indicate a group of UEs configured with the PRS or POS-SRS in the cell to perform the downlink positioning measurement or POS-SRS transmission. For example, a group of UEs monitoring the paging opportunity and configured with the PRS or POS-SRS can be indicated to perform the downlink positioning measurement or POS-SRS transmission through the trigger information carried by the DCI of a paging PDCCH or the trigger information carried by the MAC CE included in a paging PDSCH.

For example, the system may group the UEs monitoring the same PO, and the trigger information may contain multiple indication fields, each of which is used to indicate one group of UEs to perform the downlink positioning measurement or POS-SRS transmission, respectively. The UE can determine the group number Group_index of the belonged group according to some parameters, for example, Group_index=UE_id % Num_Group, where UE_ID=5G-S-TMSI %1024, and Num_Group is the total number of UE groups, which can be predefined or preconfigured; or the Group_index of the belonged group of the UE is preconfigured by the network in the RRC connected state.

Optionally, the above trigger information may indicate one specific UE configured with the PRS or POS-SRS in the cell to perform the downlink positioning measurement or POS-SRS transmission. For example, one specific UE may be indicated to perform the downlink positioning measurement or POS-SRS transmission through the trigger information carried by the paging message contained in the paging PDSCH or the trigger information carried by the dedicated physical channel/signal.

Optionally, the above trigger information may indicate that the positioning measurement is based on a certain one of a plurality of preconfigured PRSs (or POS-SRSs). That is, the PRS (or POS-SRS) configuration information may include multiple PRSs (or POS-SRSs), and the trigger information may indicate the UE to receive one of the PRSs to perform the downlink positioning measurement, or transmit one of the POS-SRSs.

Optionally, the trigger information can trigger a certain one of a plurality of preconfigured downlink positioning measurement events. The configuration information of one downlink positioning measurement event includes the PRS, the index, and/or the periodicity, etc. of a measurement. Different downlink positioning measurement events can have different configuration information.

The related contents of transmitting an acknowledgment to the trigger information in step S440 will be described in detail below. It should be noted that the following description takes the UE in the RRC unconnected state feeding back an ACK to the received trigger information as an example, but it can be understood that the following description is only an exemplary explanation, and this disclosure is not limited to this.

If the above trigger information is for one specific UE, the UE can feedback an acknowledge (ACK) to the received trigger information to avoid unnecessary waste of resources when the trigger information is not successfully received.

Optionally, the UE in the RRC unconnected state feeds back an ACK to the received trigger information indicating the downlink positioning measurement or POS-SRS transmission, so as to ensure the reliability of transmission. The purpose is to let the base station know whether the UE successfully receives the trigger information. If the UE successfully receives the trigger information, the base station may transmit the PRS of the UE or receive the POS-SRS transmitted by the UE. If the UE fails to receive the trigger information, the base station does not need to transmit the PRS or receive the POS-SRS transmitted by the UE, the physical resources used for the PRS or POS-SRS transmission can be used by the base station for other transmissions to save system resources, and the base station can try to transmit the trigger information indicating downlink positioning measurement or POS-SRS transmission again in the next periodicity.

Here, the ACK of the trigger information can be carried by MAC CE, and the UE can transmit the MAC CE by uplink small data transmission (SDT) technology; or the ACK of the trigger information is carried by the physical layer uplink control information (UCI), and PUCCH resources for transmitting the ACK can be indicated in the corresponding trigger information.

The following is a detailed description of the contents related to the UE reporting the downlink positioning measurement results to the base station in the RRC unconnected state in step S520.

The UE in the RRC unconnected state receives the PRS to perform the downlink positioning measurement, and reports the results of downlink positioning measurement to the network. The UE can use the uplink small data transmission (SDT) technology for the RRC unconnected state to report the results of the downlink positioning measurement to the network. The uplink SDT includes PRACH-based SDT (called PRACH-SDT) and preconfigured-uplink-resources-based SDT (called UL-CG-SDT, configured Grant SDT).

The PRACH-SDT includes a two-step PRACH procedure and a four-step PRACH procedure. In the two-step PRACH procedure, small data packets are carried through the PUSCH of MsgA, and in the four-step PRACH procedure, small data packets are carried through the PUSCH of Msg3. For UL-CG-SDT, small data packets are carried by the PUSCH transmitted on preconfigured uplink resources.

Optionally, the UE in the RRC unconnected state reports the results of the downlink positioning measurement to the network through PRACH-SDT, and the PRACH resources of the PRACH-SDT is specially configured for reporting the downlink positioning measurement result, that is, the PRACH resources of the PRACH-SDT is configured separately from the PRACH resources of PRACH-SDT used for other small data packets transmission.

Optionally, the UE reports the results of the downlink positioning measurement to the network based on non-contention PRACH-SDT. For example, the non-contention PRACH resources may be indicated in the trigger instruction of the downlink positioning measurement, including a preamble index of PRACH, a time-frequency resource index (i.e., mask index) of PRACH, a SSB index associated with PRACH, and/or a CSI-RS index associated with PRACH, etc. In an example, the non-contention PRACH configuration for reporting downlink positioning measurement results is optional. If the network does not configure non-contention PRACH resources, the UE uses contention PRACH resources by default.

Optionally, the UE in the RRC unconnected state reports the results of the downlink positioning measurement to the network through a preconfigured PUSCH (i.e., UL-CG-SDT), which periodically uses the same physical resources, and the physical resources for transmitting PUSCH (e.g., UL Grant) can be preconfigured through higher layer signaling, similar to Type 1 CG of the existing system; or, the physical resources for transmitting PUSCH may be indicated when the configuration is activated, which is similar to Type 2 CG of the existing system. For example, the PUSCH configuration may be activated by indicating the physical resources in the trigger instruction of the downlink positioning measurement.

Optionally, the UE in the RRC unconnected state reports the downlink positioning measurement results to the network through the dynamically scheduled PUSCH, and the UE can monitor the scheduling PDCCH of the PUSCH at a specific position or within a window. If the UE monitors the scheduling PDCCH of the PUSCH, the UE reports the downlink positioning measurement results through the PUSCH, and then goes to a sleep state. If the PUSCH is not monitored by the UE, the UE reports the downlink positioning measurement results through other means, for example, through the above UL SDT technology or establishing RRC connection, to report the downlink positioning measurement results.

In an example, the UE may monitor the scheduling PDCCH of the PUSCH at a specific position or within a window after the measured PRS, and the time domain position or window position of the search space for the PDCCH scheduling the PUSCH is related to the time domain position of the PRS, and the interval between them is preconfigured.

In another example, the UE monitors the scheduling PDCCH of the PUSCH at a specific position or within a window after the trigger information indicating the downlink positioning measurement, and the time domain position or window position of the search space for the PDCCH scheduling the PUSCH is related to the time domain position of the trigger information, and the interval between them is preconfigured or indicated in the trigger information. Particularly, the trigger information may also indicate whether the UE monitors the scheduling PDCCH of the PUSCH at the position after the trigger information.

In yet another example, the UE may monitor the scheduling PDCCH of the PUSCH at a specific position or within a window after the paging opportunity, and the time domain position or window position of the search space for the PDCCH scheduling the PUSCH is related to the time domain position of the paging opportunity, and the interval between them is preconfigured or indicated in the paging opportunity. Particularly, the paging opportunity may also indicate whether the UE monitor the scheduling PDCCH of the PUSCH at the position after the paging opportunity.

The related contents of the UE in the RRC unconnected state receiving the uplink positioning measurement results or location information transmitted by the network in step S620 will be described in detail below.

The UE may receive the uplink positioning measurement results or location information transmitted by the network, and the location information may be location information calculated by the LMF based on the uplink positioning measurement results and/or the downlink positioning measurement results. The UE may use the downlink small packet transmission SDT technology for the RRC unconnected state to receive the uplink positioning measurement results or location information transmitted by the network, for example, the UE receives the uplink positioning measurement results or location information through a paging message, the preconfigured PDSCH.

Among them, SDT technology based on a paging message can be called Paging-SDT, and the system can introduce a new paging reason, that is, the paging message carries a small amount of data of the UE, and the UE in the RRC unconnected state can continue retaining in the RRC unconnected state after receiving the paging message. The maximum amount of data that can be carried by a paging message can be preconfigured.

SDT technology based on a preconfigured PDSCH can be called DL-CG-SDT, similar to UL-CG-SDT, base station transmits a PDSCH on preconfigured physical resources to carry a small amount of data of the UE, the PDSCH periodically uses the same physical resources, and the UE in the RRC unconnected state can wake up periodically to receive the PDSCH on preconfigured physical resources.

Similar to the UL-CG of the existing system, DL-CG can also include two types. One is that all transmission parameters including physical resources, are preconfigured by high-layer signaling, similar to Type 2 UL CG, which can also be called Type 2 DL CG herein; the other is that transmission parameters other than physical resources are preconfigured by high-layer signaling, while the physical resources are indicated when being activated, similar to Type 1 UL CG (DCI is used to activate configuration and indicate scheduling resources), which can also be called Type 1 DL CG herein, and Type 1 DL CG can be activated and configured by a paging message. The paging message can also indicate scheduling resources of PDSCH and/or transmission times of PDSCH while activating Type 1 DL CG (the PDSCH periodically uses the same physical resources). The difference between Type 1 DL CG and Type 1 UL CG is that the former activates and indicates scheduling resources through a paging message (i.e., a paging PDSCH), while the latter activates and indicates scheduling resources through DCI.

Optionally, the UE in the RRC unconnected state receives the uplink positioning measurement results or location information transmitted by the network through a preconfigured PDSCH, which may be the above-mentioned Type 1 DL CG or Type 2 DL CG. If the UE successfully receives the PDSCH, the UE may feedback an ACK on PUCCH resources preconfigured by high-layer signaling, and/or if the UE fails to successfully receive the PDSCH, it may feedback a NACK on PUCCH resources preconfigured by high-layer signaling.

Optionally, the UE in the RRC unconnected state receives the uplink positioning measurement results or location information transmitted by the network through the dynamically scheduled PDSCH, and the UE can monitor the scheduling PDCCH of the PDSCH at a specific location or within a window.

In an example, the UE monitors the scheduling PDCCH of the PDSCH at a specific position or within a window after the transmitted POS-SRS, and the PDSCH carries the uplink positioning measurement results or location information obtained based on the POS-SRS, that is, the time domain position or window position of the search space for the PDCCH scheduling the PDSCH is related to the time domain position of the POS-SRS, and the interval between them can be preconfigured.

In an example, the UE monitors the scheduling PDCCH of the PDSCH at a specific position or within a window after the measured PRS, and the PDSCH carries the location information obtained based on the PRS, that is, the time domain position or window position of the search space for the PDCCH scheduling the PDSCH is related to the time domain position of the PRS, and the interval between them can be preconfigured.

In another example, the UE monitors the scheduling PDCCH of the PDSCH at a specific position or within a window after the trigger information indicating the POS-SRS transmission, and the PDSCH carries the uplink positioning measurement results or location information obtained based on the POS-SRS, that is, the time domain position or window position of the search space for the PDCCH scheduling the PDSCH is related to the time domain position of the trigger information, and the interval between them is preconfigured or indicated in the trigger information. Particularly, the trigger information may also indicate whether the UE monitors the scheduling PDCCH of the PDSCH after the trigger information.

In another example, the UE monitors the scheduling PDCCH of the PDSCH at a specific position or within a window after the trigger information indicating the downlink positioning measurement, and the PDSCH carries the location information obtained based on the downlink positioning measurement, that is, the time domain position or window position of the search space for the PDCCH scheduling the PDSCH is related to the time domain position of the trigger information, and the interval between them is preconfigured or indicated in the trigger information. Particularly, the trigger information may also indicate whether the UE monitors the scheduling PDCCH of the PDSCH after the trigger information.

In another example, the UE monitors the scheduling PDCCH of the PDSCH at a specific position or within a window after the paging opportunity, that is, the time domain position or window position of the search space for the PDCCH scheduling the PDSCH is related to the time domain position of the paging opportunity, and the interval between them is preconfigured or indicated in the paging opportunity. Particularly, the paging opportunity may also indicate whether the UE monitor the scheduling PDCCH of the PDSCH at the position after the paging opportunity.

Optionally, if the uplink positioning measurement is based on the PRACH, the uplink positioning measurement results or location information can be transmitted to the UE in the PRACH process. For example, for a 2-step PRACH process, the uplink positioning measurement results or location information can be carried in MsgB; for the 4-step PRACH process, the uplink positioning measurement results or location information can be carried in Msg2 or Msg4.

Embodiments of the disclosure provide a positioning measurement method performed by a user equipment (UE), which enables the UE to realize positioning measurement in the RRC unconnected state, saves a lot of signaling overhead, reduces network delay, and greatly improves the efficiency of network and equipment. Embodiments of the disclosure also provide related technical details of the positioning measurement method performed by the user equipment (UE) in the radio resource control (RRC) unconnected state, which makes the technical details of the above method clearer and more flexible and diversified.

Figure 17:
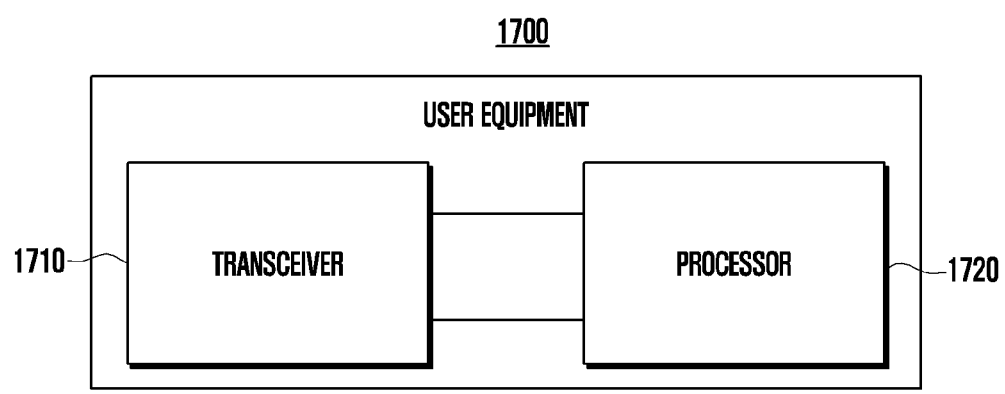
FIG. 17 is a block diagram illustrating the structure of a UE according to an embodiment of the disclosure.

FIG. 17 is a block diagram illustrating the structure of a user equipment 1700 according to an embodiment of the disclosure.

Referring to FIG. 17, the user equipment 1700 includes a transceiver 1710 and a processor 1720. The transceiver 1710 is configured to transmit and receive signals to and from the outside. The processor 1720 is configured to perform any of the above method performed by the user equipment. The user equipment 1700 can be implemented in the form of hardware, software or a combination of hardware and software, so that the UE can perform the method for data transmission described in the disclosure.

Figure 18:
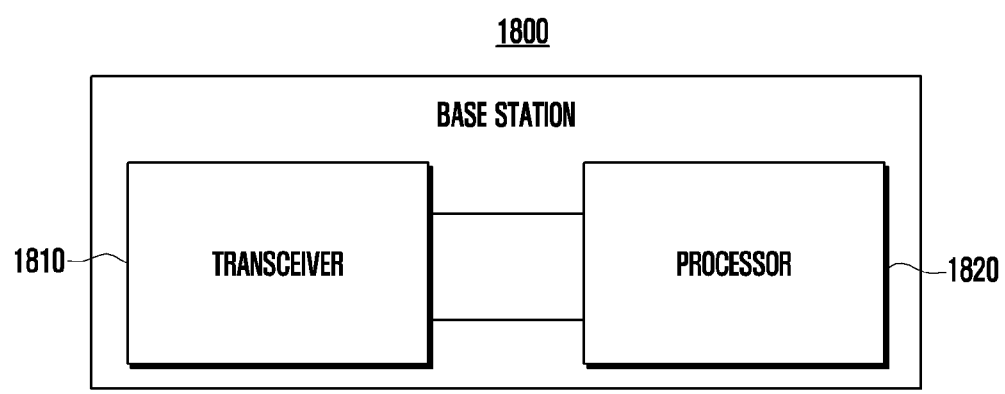
FIG. 18 is a block diagram illustrating the structure of a base station according to an embodiment of the disclosure.

FIG. 18 is a block diagram illustrating the structure of a base station 1800 according to an embodiment of the disclosure.

Referring to FIG. 18, the base station 1800 includes a transceiver 1810 and a processor 1820. The transceiver 1810 is configured to transmit and receive signals to and from the outside. The processor 1820 is configured to perform any of the above method performed by the base station. The base station 1800 can be implemented in the form of hardware, software or a combination of hardware and software, so that the base station can perform the method for data transmission described in the disclosure.

At least one embodiment of the disclosure also provides a non-transitory computer-readable recording medium having stored thereon a program, which when performed by a computer, performs the methods described above.

According to an aspect of the disclosure, there is provided a method performed by a user equipment (UE), comprising: acquiring configuration information of a reference signal for positioning measurement, wherein the reference signal for positioning measurement includes a first signal for downlink positioning measurement and/or a second signal for uplink positioning measurement; and performing operations related to positioning measurement in a radio resource control (RRC) unconnected state.

The method performed by a user equipment (UE) according to the disclosure, wherein the reference signal for positioning measurement is the first signal, and the performing operations related to positioning measurement in the RRC unconnected state comprises: receiving the first signal in the RRC unconnected state and performing downlink positioning measurement on the first signal; and reporting downlink positioning measurement results to a base station in the RRC unconnected state.

The method performed by the user equipment (UE) according to the disclosure further comprises receiving location information obtained based on the first signal in the RRC unconnected state.

According to the method performed by the user equipment (UE) provided by the disclosure, wherein the reference signal for positioning measurement is the second signal, and the performing operations related to positioning measurement in the RRC unconnected state comprises: transmitting the second signal in the RRC unconnected state.

According to the method performed by the user equipment (UE) provided by the disclosure, the method further comprises: receiving uplink positioning measurement results or location information obtained based on the second signal in the RRC unconnected state.

According to the method performed by the user equipment (UE) provided by the disclosure, wherein the acquiring configuration information of a reference signal for positioning measurement comprises at least one of the following: receiving system information, wherein the system information contains configuration information of a reference signal for positioning measurement; acquiring and retaining configuration information of a reference signal for positioning measurement used in an RRC connected state, and taking the configuration information as configuration information of a reference signal for positioning measurement used in RRC unconnected state; or receiving an RRC release message, wherein the RRC release message contains configuration information of a reference signal for positioning measurement.

According to the method performed by the user equipment (UE) provided by the disclosure, the method further comprises: determining whether the configuration information of the reference signal for positioning measurement is invalid; if the configuration information of the reference signal for positioning measurement is invalid, the UE acquires new configuration information of the reference signal for positioning measurement.

The method performed by the user equipment (UE) according to the disclosure, wherein the determining whether the configuration information of the reference signal for positioning measurement is invalid comprises: determining whether a cell where the UE currently camps and a cell where the UE located while acquiring the configuration information of the reference signal for positioning measurement belong to at least one of the following: a same tracking area TA, a management area of a same positioning management function LMF entity, all cells associated with the configuration information of the reference signal for positioning measurement, or a same cell; If yes, determining that the configuration information of the reference signal for positioning measurement is valid; otherwise, determining that the configuration information of the reference signal for positioning measurement is invalid.

According to the method performed by the user equipment (UE) provided by the disclosure, the method further comprises: receiving first indication information, wherein the first indication information is used for indicating whether a synchronization signal block (SSB) can be used for assisting in downlink positioning measurement.

According to the method performed by the user equipment (UE) provided by the disclosure, the method further comprises: receiving second indication information indicating a power offset of energy per resource element between the first signal and the SSB.

According to the method performed by the user equipment (UE) provided by the disclosure, the method further comprises: acquiring trigger information, wherein the trigger information is used for activating the UE to perform operations related to positioning measurement in the RRC unconnected state.

According to the method performed by the user equipment (UE) provided by the disclosure, wherein the trigger information includes at least one of the following: trigger information indicating all UEs in a RRC unconnected state configured with a reference signal for positioning measurement in a cell to perform operations related to positioning measurement; trigger information indicating a group of UEs in a RRC unconnected state configured with a reference signal for positioning measurement in a cell to perform operations related to positioning measurement; trigger information indicating one specific UE in a RRC unconnected state configured with a reference signal for positioning measurement in a cell to perform operations related to positioning measurement; trigger information indicating one of a plurality of preconfigured measurement events for positioning measurement; or trigger information indicating one of a plurality of preconfigured reference signals for positioning measurement.

According to the method performed by the user equipment (UE) provided by the disclosure, the acquiring trigger information includes at least one of the following: receiving an RRC release message, wherein the RRC release message contains the trigger information; receiving a paging physical downlink control channel PDCCH or a paging physical downlink shared channel PDSCH, wherein the paging PDCCH or paging PDSCH contains the trigger information; or receiving a dedicated channel/signal, wherein the dedicated channel/signal contains the trigger information.

The method performed by the user equipment (UE) according to the disclosure, wherein the paging PDCCH or paging PDSCH containing the trigger information comprises: DCI carried by the paging PDCCH containing an indication field, which is used to activate the UE to perform operations related to positioning measurement in the RRC unconnected state; the paging PDSCH containing a media access control control element (MAC CE), which is used to activate the UE to perform operations related to positioning measurement in the RRC unconnected state; or the paging PDSCH containing a paging message, which is used to activate the UE to perform operations related to positioning measurement in the RRC unconnected state.

According to the method performed by the user equipment (UE) provided by the disclosure, wherein the dedicated channel/signal is carried by at least one of the following: carried by a physical layer signal sequence; carried by downlink control information DCI; carried by a preconfigured physical downlink shared channel PDSCH; or carried by a PDSCH scheduled by DCI.

According to the method performed by the user equipment (UE) provided by the disclosure, wherein the acquiring the trigger information through a dedicated channel/signal comprises at least one of the following: monitoring the trigger information at a position or within a window satisfying a certain interval after a paging opportunity PO, and the size of the interval can be preconfigured or indicated by the PO; monitoring the trigger information at a position or within a window satisfying a preconfigured interval before or after a synchronization signal block (SSB); or monitoring the trigger information at a position or within a window satisfying a preconfigured interval before the first signal or the second signal.

According to the method performed by the user equipment (UE) provided by the disclosure, wherein the corresponding relationship between the PO or SSB and the trigger information satisfies at least one of the following: one PO or SSB corresponds to one piece of trigger information; the last PO or SSB among a plurality of POs or SSBs corresponds to one piece of trigger information; or one PO or SSB corresponding to trigger information in multiple transmission periodicities.

According to the method performed by the user equipment (UE) provided by the disclosure, the corresponding relationship between the first signal or the second signal and the trigger information satisfies at least one of the following: one first signal or one second signal in one or more periodicities corresponds to one piece of trigger information; a first signal group or a second signal group in one or more periodicities correspond to one piece of trigger information, wherein the first signal group includes multiple first signals and the second signal group includes multiple second signals; or a plurality of first signal groups or a plurality of second signal groups correspond to one piece of trigger information.

According to the method performed by the user equipment (UE) provided by the disclosure, in a case that one first signal or one second signal in one or more periodicities corresponds to one piece of trigger information, monitoring the trigger information at a position or within a window satisfying a preconfigured interval before the first signal or the second signal, comprises: monitoring the trigger information at a position or within a window satisfying a preconfigured interval before one first signal or one second signal in one or more periodicities, and the trigger information instructs the UE to perform downlink positioning measurement on the first signal in the one or more periodicities or transmit the second signal in the one or more periodicities.

According to the method performed by the user equipment (UE) provided by the disclosure, in a case that a first signal group or a second signal group in one or more periodicities corresponds to one piece of trigger information, the monitoring the trigger information at a position or within a window satisfying a preconfigured interval before the first signal or the second signal, comprises: monitoring the trigger information at a position or within a window satisfying a preconfigured interval before the first signal group or the second signal group in one or more periodicities, and the trigger information instructs the UE to perform downlink positioning measurement on the first signal group in the one or more periodicities or transmit the second signal group in the one or more periodicities.

According to the method performed by the user equipment (UE) provided by the disclosure, in a case that a plurality of first signal groups or a plurality of second signal groups correspond to one piece of trigger information, monitoring the trigger information at a position or within a window satisfying a preconfigured interval before the first signal or the second signal comprises: monitoring the trigger information at a position or within a window satisfying a preconfigured interval before the plurality of first signal groups or the plurality of second signal groups, and the trigger information instructs the UE to perform downlink positioning measurement on the plurality of first signal groups or transmit the plurality of second signal groups.

According to the method performed by the user equipment (UE) provided by the disclosure, the method further comprises: transmitting an acknowledgement to the trigger information, wherein the acknowledgement is carried by a media access control control element (MAC CE); or, carried by physical layer uplink control information (UCI).

According to the method performed by the user equipment (UE) provided by the disclosure, wherein the reporting downlink positioning measurement results to a base station comprises at least one of the following: reporting the downlink positioning measurement results to the base station through a physical uplink shared channel PUSCH in a contention-based random access procedure; reporting the downlink positioning measurement results to the base station through a PUSCH in a non-contention-based random access procedure; reporting the downlink positioning measurement results to the base station through a preconfigured PUSCH; or reporting the downlink positioning measurement results to the base station through a dynamically scheduled PUSCH.

According to the method performed by the user equipment (UE) provided by the disclosure, wherein the resources for the physical random access channel (PRACH) in the non-contention-based random access procedure are preconfigured, indicated in a paging message, or indicated in trigger information for activating downlink positioning measurement, and the resources for the PRACH include at least one of the following: a preamble index of the PRACH, a time-frequency resource index of the PRACH, a synchronization signal block (SSB) index associated with the PRACH, and/or a channel state information reference signal CSI-RS index associated with the PRACH.

According to the method performed by the user equipment (UE) provided by the disclosure, wherein the physical resources for the preconfigured PUSCH are preconfigured, indicated in a paging message, or indicated in trigger information for activating downlink positioning measurement.

According to the method performed by the user equipment (UE) provided by the disclosure, the method further comprises: monitoring control information for dynamically scheduling the PUSCH for reporting the downlink positioning measurement results by at least one of the following: monitoring the control information for dynamically scheduling the PUSCH at a position or within a window satisfying a preconfigured interval after the measured first signal; monitoring control information for dynamic scheduling the PUSCH at a position or within a window satisfying a certain interval after the trigger information for activating downlink positioning measurement, wherein the size of the interval is preconfigured or indicated in the trigger information; or monitoring control information for dynamically scheduling the PUSCH at a position or within a window satisfying a certain interval after a paging opportunity, wherein the size of the interval is preconfigured or indicated in the paging opportunity.

According to the method performed by the user equipment (UE) provided by the disclosure, wherein the receiving location information obtained based on the first signal and the receiving the uplink positioning measurement results or location information obtained based on the second signal comprise at least one of the following: receiving the uplink positioning measurement results or location information through a paging message; receiving the uplink positioning measurement results or location information through a preconfigured physical downlink shared channel PDSCH; receiving the uplink positioning measurement results or location information through a dynamically scheduled PDSCH; or receiving the uplink positioning measurement results or location information through at least one of MsgB in a two-step random access procedure or Msg2 or Msg4 in a four-step random access procedure.

According to the method performed by the user equipment (UE) provided by the disclosure, the physical resources for the preconfigured PDSCH are preconfigured, indicated in a paging message, or indicated in trigger information for activating uplink positioning measurement.

According to the method performed by the user equipment (UE) provided by the disclosure, the method further comprises: monitoring the control information for dynamically scheduling the PDSCH carrying the uplink positioning measurement results by at least one of the following: monitoring the control information for dynamically scheduling the PDSCH at a position or within a window satisfying a preconfigured interval after the transmitted second signal; monitoring the dynamic scheduling of the PDSCH at a position or within a window satisfying a certain interval after the trigger information for activating the uplink positioning measurement, wherein the size of the interval is preconfigured or indicated in the trigger information; or monitoring the dynamic scheduling of the PDSCH at a position or within a window satisfying a certain interval after a paging opportunity, and the size of the interval is preconfigured or indicated in the paging opportunity.

According to the method performed by the user equipment (UE) provided by the disclosure, wherein the first signal includes a positioning reference signal (PRS), and the second signal includes a sounding reference signal (SRS) or a physical random access channel (PRACH).

According to an aspect of the disclosure, there is provided a user equipment, the user equipment comprises: a transceiver configured to transmit and receive signals with the outside; and a processor configured to control the transceiver to perform a method according to the positioning measurement method performed by the user equipment (UE).

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the present disclosure of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system.

Those skilled may implement the described function sets in different ways for each specific application, but such design decisions should not be interpreted as causing a departure from the scope of this application.

The various illustrative logic blocks, modules, and circuits described in this application may be implemented by a general purpose processor, a digital signal processor (DSP), an application specific integrated circuit (ASIC), a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination of both. The software module may reside in a RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage medium. In an alternative, the storage medium may be integrated into the processor. The processor and the storage medium may reside in the ASIC. The ASIC may reside in the user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more instructions or codes on a computer-readable medium or transferred by it. Computer-readable media include both computer storage media and communication media, the latter including any media that facilitates the transfer of computer programs from one place to another. A storage medium may be any available medium that can be accessed by a general purpose or special purpose computer.

The above description are only exemplary embodiments of the disclosure, but the protection scope of the disclosure is not limited thereto. Any of those familiar with this technical field can make various changes or substitutions within the technical scope disclosed in the disclosure, and these changes or substitutions should be covered within the protection scope of the disclosure. Therefore, the protection scope of the disclosure shall be subject to the protection scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
  receiving a radio resource control (RRC) release message including first configuration information on a sounding reference signal (SRS) for positioning in an RRC inactive state, wherein the first configuration information on the SRS for positioning in the RRC inactive state includes identities of cells where the first configuration information on the SRS for positioning in the RRC inactive state is valid;
  identifying that a camped cell is included in the cells where the first configuration information on the SRS for positioning in the RRC inactive state is valid; and
  while in the RRC inactive state, transmitting, on the camped cell, the SRS for positioning in the RRC inactive state, based on the first configuration information on the SRS for positioning in the RRC inactive state,
  wherein the method further comprises:
    receiving second configuration information on a positioning reference signal (PRS), in a RRC connected state;
    receiving the PRS in an RRC idle state or the RRC inactive state, based on the second configuration information; and
    transmitting, to a base station, a result of a downlink positioning measurement measured based on the PRS,
  wherein the result of the downlink positioning measurement is transmitted in at least one of a physical uplink shared channel (PUSCH) in a contention-based random access procedure, a PUSCH in a non-contention-based random access procedure, a preconfigured PUSCH, or a dynamically scheduled PUSCH.

2. The method of claim 1, further comprising:
  receiving a result of an uplink positioning measurement and location information associated with the UE in the RRC inactive state,
  wherein the result of the uplink positioning measurement and the location information are determined based on the SRS for positioning, and
  wherein the result of the uplink positioning measurement and the location information are received via at least one of a paging message, a preconfigured physical downlink shared channel (PDSCH), a dynamically scheduled PDSCH, a message B (MsgB) in a two-step random access procedure, or a message 4 (Msg4) in a four-step random access procedure.

3. The method of claim 1, further comprising:
  camping on a first cell that is different from a second cell in which the first configuration information on the SRS for positioning in the RRC inactive state is obtained;
  identifying, based on the first configuration information on the SRS for positioning in the RRC inactive state, whether the first cell belongs to the cells where the first configuration information on the SRS for positioning in the RRC inactive state is valid; and
  obtaining, in the first cell, third configuration information on the SRS for positioning in case that the first cell does not belong to the cells where the first configuration information on the SRS for positioning in the RRC inactive state is valid.

4. The method of claim 1, further comprising:
  receiving information indicating whether to use a synchronization signal block (SSB) for the downlink positioning measurement.

5. The method of claim 1, further comprising:
  obtaining trigger information to trigger an operation related to the downlink positioning measurement,
  wherein the trigger information indicates at least one of:
    all UEs in the RRC idle state or the RRC inactive state to trigger the operation related to the downlink positioning measurement;

a group of UEs in the RRC idle state or the RRC inactive state to trigger the operation related to the downlink positioning measurement;
a specific UE in the RRC idle state or the RRC inactive state to trigger the operation related to the downlink positioning measurement;
one of a plurality of preconfigured measurement events for the downlink positioning measurement; or
one of a plurality of preconfigured reference signals for the downlink positioning measurement, and
wherein the trigger information is obtained via at least one of the RRC release message, a physical downlink control channel (PDCCH) for a paging, a physical downlink shared channel (PDSCH) for a paging, or a dedicated channel for the UE.

6. The method of claim 1, further comprising:
receiving a message associated with activation of a transmission of the SRS for positioning in the RRC inactive state, via medium access control (MAC) control element (CE) signaling.

7. The method of claim 5, wherein the trigger information is obtained by at least one of:
monitoring the trigger information at a position or within a window satisfying a certain interval after a paging occasion (PO), the certain interval being preconfigured or indicated by the PO;
monitoring the trigger information at the position or within the window satisfying a preconfigured interval before or after a synchronization signal block (SSB); or
monitoring the trigger information at the position or within the window satisfying a preconfigured interval before the PRS.

8. The method of claim 6, further comprising:
transmitting an acknowledgement for the trigger information via at least one of a medium access control (MAC) control element (CE) or uplink control information (UCI).

9. A user equipment (UE) in a communication system, the UE comprising:
a transceiver; and
a processor coupled with the transceiver and configured to:
receive a radio resource control (RRC) release message including first configuration information on a sounding reference signal (SRS) for positioning in an RRC inactive state, wherein the first configuration information on the SRS for positioning in the RRC inactive state includes identities of cells where the first configuration information on the SRS for positioning in the RRC inactive state is valid,
identify that a camped cell is included in the cells where the first configuration information on the SRS for positioning in the RRC inactive state is valid, and
while in the RRC inactive state, transmit, on the camped cell, the SRS for positioning in the RRC inactive state, based on the first configuration information on the SRS for positioning in the RRC inactive state,
wherein the processor is further configured to:
receive second configuration information on a positioning reference signal (PRS), in an RRC connected state,
receive the PRS in an RRC idle state or the RRC inactive state, based on the second configuration information; and transmit, to a base station, a result of a downlink positioning measurement measured based on the PRS,
wherein the result of the downlink positioning measurement is transmitted in at least one of a physical uplink shared channel (PUSCH) in a contention-based random access procedure, a PUSCH in a non-contention-based random access procedure, a preconfigured PUSCH, or a dynamically scheduled PUSCH.

10. The UE of claim 9, wherein the processor is further configured to:
receive a result of an uplink positioning measurement and location information associated with the UE in the RRC inactive state,
wherein the result of the uplink positioning measurement and the location information are determined based on the SRS, and
wherein the result of the uplink positioning measurement and the location information are received via at least one of a paging message, a preconfigured physical downlink shared channel (PDSCH), a dynamically scheduled PDSCH, a message B (MsgB) in a two-step random access procedure, or a message 4 (Msg4) in a four-step random access procedure.

11. The UE of claim 9, wherein the processor is further configured to:
camp on a first cell that is different from a second cell in which the first configuration information on the SRS for positioning in the RRC inactive state is obtained,
identify, based on the first configuration information on the SRS for positioning in the RRC inactive state, whether the first cell belongs to the cells where the first configuration information on the SRS for positioning in the RRC inactive state is valid, and
obtain, in the first cell, third configuration information on the SRS for positioning in case that the first cell does not belong to the cells where the first configuration information on the SRS for positioning in the RRC inactive state is valid.

12. The UE of claim 9, wherein the processor is further configured to:
receive information indicating whether to use a synchronization signal block (SSB) for the downlink positioning measurement.

13. The UE of claim 9, wherein the processor is further configured to:
obtain trigger information to trigger an operation related to the downlink positioning measurement,
wherein the trigger information indicates at least one of:
all UEs in the RRC idle state or the RRC inactive state to trigger the operation related to the downlink positioning measurement;
a group of UEs in the RRC idle state or the RRC inactive state to trigger the operation related to the downlink positioning measurement;
a specific UE in the RRC idle state or the RRC inactive state to trigger the operation related to the downlink positioning measurement;
one of a plurality of preconfigured measurement events for the downlink positioning measurement; or
one of a plurality of preconfigured reference signals for the downlink positioning measurement, and
wherein the trigger information is obtained via at least one of the RRC release message, a physical downlink control channel (PDCCH) for a paging, a physical downlink shared channel (PDSCH) for a paging, or a dedicated channel for the UE.

14. The UE of claim 9,
wherein the processor is further configured to:
receive a message associated with activation of a transmission of the SRS for positioning in the RRC inactive state, via medium access control (MAC) control element (CE) signaling.

15. The UE of claim 13, wherein the trigger information is obtained by at least one of:
monitoring the trigger information at a position or within a window satisfying a certain interval after a paging occasion (PO), the certain interval being preconfigured or indicated by the PO;
monitoring the trigger information at the position or within the window satisfying a preconfigured interval before or after a synchronization signal block (SSB); or
monitoring the trigger information at the position or within the window satisfying a preconfigured interval before the PRS.

16. The UE of claim 13, wherein the processor is further configured to:
transmit an acknowledgement for the trigger information via at least one of a medium access control (MAC) control element (CE) or uplink control information (UCI).

17. A method performed by a base station in a communication system, the method comprising:
transmitting, to a user equipment (UE), a radio resource control (RRC) release message including first configuration information on a sounding reference signal (SRS) for positioning in an RRC inactive state, wherein the first configuration information on the SRS for positioning in the RRC inactive state includes identities of cells where the first configuration information on the SRS for positioning in the RRC inactive state is valid; and
in case that a camped cell is included in the cells where the first configuration information on the SRS for positioning in the RRC inactive state is valid, receiving, from the UE while the UE is in the RRC inactive state on the camped cell, the SRS for positioning, based on the first configuration information on the SRS for positioning in the RRC release message,
wherein the method further comprises:
transmitting, to the UE, second configuration information on a positioning reference signal (PRS), in a RRC connected state;
transmitting, to the UE, the PRS in an RRC idle state or the RRC inactive state, based on the second configuration information; and
receiving, from the UE, a result of a downlink positioning measurement measured based on the PRS,
wherein the result of the downlink positioning measurement is received in at least one of a physical uplink shared channel (PUSCH) in a contention-based random access procedure, a PUSCH in a non-contention-based random access procedure, a preconfigured PUSCH, or a dynamically scheduled PUSCH.

18. The method of claim 17, further comprising:
transmitting, to the UE, a message associated with activation of a transmission of the SRS for positioning via medium access control (MAC) control element (CE) signaling.

* * * * *